United States Patent
Ren et al.

(10) Patent No.: US 10,275,188 B2
(45) Date of Patent: Apr. 30, 2019

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD

(71) Applicant: Brother Kogyo Kabushiki Kaisha, Nagoya-shi, Aichi (JP)

(72) Inventors: Yongyong Ren, Nagoya (JP); Makoto Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/939,539

(22) Filed: Mar. 29, 2018

(65) Prior Publication Data
US 2019/0050170 A1    Feb. 14, 2019

(30) Foreign Application Priority Data
Aug. 10, 2017   (JP) .................... 2017-155971

(51) Int. Cl.
G06F 3/12       (2006.01)
G06F 21/60      (2013.01)

(52) U.S. Cl.
CPC .......... *G06F 3/1203* (2013.01); *G06F 3/1288* (2013.01); *G06F 21/608* (2013.01)

(58) Field of Classification Search
None
See application file for complete search history.

(56) References Cited

U.S. PATENT DOCUMENTS

| | | | |
|---|---|---|---|
| 8,947,693 B2 | 2/2015 | Aritomi | |
| 2012/0117629 A1* | 5/2012 | Miyazawa | H04L 63/08 726/4 |
| 2014/0071476 A1 | 3/2014 | Aritomi | |
| 2015/0095463 A1* | 4/2015 | Saito | H04L 63/0807 709/219 |

FOREIGN PATENT DOCUMENTS

JP    2014-056320 A    3/2014

* cited by examiner

*Primary Examiner* — Huo Long Chen
(74) *Attorney, Agent, or Firm* — Banner & Witcoff, Ltd.

(57) ABSTRACT

A communication device may send a first registration request including first device identification information to a server in a case where an input of a first registration instruction is received, wherein in the server, the first device identification information, first account information, and first communication authentication information may be registered in association with each other. The communication device may send a second registration request including second device identification information the server in a case where an input of a second registration instruction is received, wherein in the server, the second device identification information, second account information, and second communication authentication information may be registered in association with each other.

16 Claims, 13 Drawing Sheets

FIG. 3

User Management Table 38 (First Embodiment)

| Registration State | Unregistered | Unregistered |
|---|---|---|
| Login State | Login | Logout |
| User ID | User1 | User2 |
| Password | P1 | P2 |
| Account Information | NONE | NONE |
| Registration ID | NONE | NONE |
| Management ID | NONE | NONE |
| Token | NONE | NONE |
| Image Process Limitation Information — Monochrome Print | ○ | ○ |
| Image Process Limitation Information — Color Print | × | ○ |
| Image Process Limitation Information — Monochrome Scan | × | ○ |
| Image Process Limitation Information — Color Scan | × | ○ |

→

| Registration State | Registered | Registered |
|---|---|---|
| Login State | Logout | Logout |
| User ID | User1 | User2 |
| Password | P1 | P2 |
| Account Information | AI1 | AI2 |
| Registration ID | A-T1 | A-T2 |
| Management ID | Printer1 | Printer2 |
| Token | AT1 | AT2 |
| Image Process Limitation Information — Monochrome Print | ○ | ○ |
| Image Process Limitation Information — Color Print | × | ○ |
| Image Process Limitation Information — Monochrome Scan | × | ○ |
| Image Process Limitation Information — Color Scan | × | ○ |

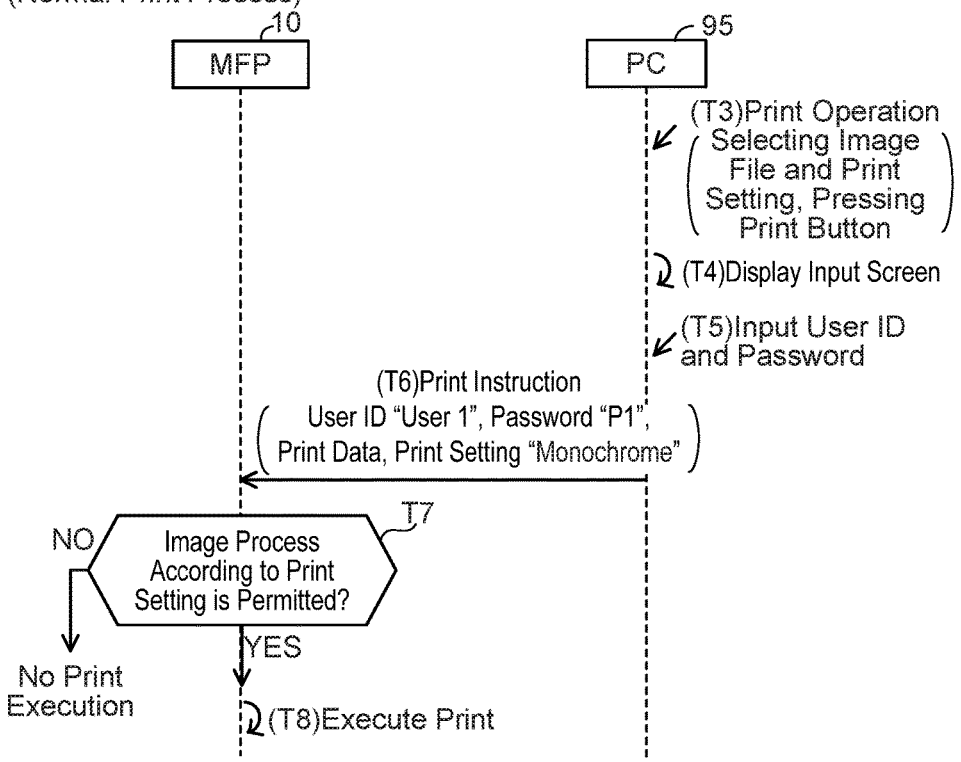

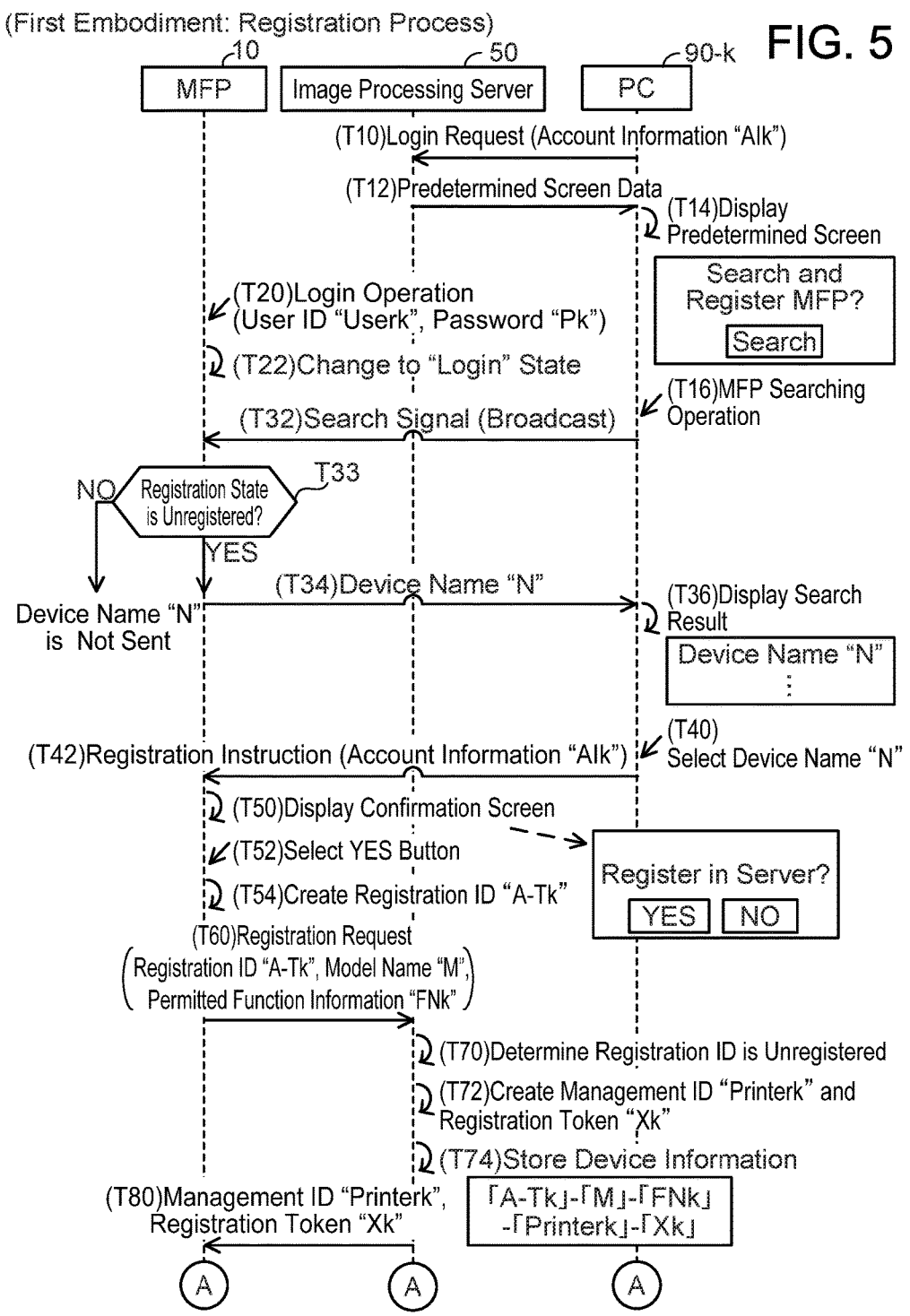

FIG. 11

User Management Table 38 (Second Embodiment)

| | Registration State | Unregistered | Unregistered | ... |
|---|---|---|---|---|
| | Login State | Login | Logout | ... |
| | User ID | User1 | User2 | ... |
| | Password | P1 | P2 | ... |
| Account Information | Registration ID | NONE | NONE | ... |
| | Management ID | NONE | NONE | ... |
| | Token | NONE | NONE | ... |
| Image Process Limitation Information | Monochrome Print | ○ | ○ | ... |
| | Color Print | × | ○ | ... |
| | Monochrome Scan | × | ○ | ... |
| | Color Scan | × | ○ | ... |

↑

| | Registration State | Registered | Registered | ... |
|---|---|---|---|---|
| | Login State | Logout | Logout | ... |
| | User ID | User1 | User2 | ... |
| | Password | P1 | P2 | ... |
| Account Information | Registration ID | A-T1 | A-T2 | ... |
| | Management ID | Printer1 | Printer2 | ... |
| | Token | AT1 | AT2 | ... |
| Image Process Limitation Information | Monochrome Print | ○ | ○ | ... |
| | Color Print | × | ○ | ... |
| | Monochrome Scan | × | ○ | ... |
| | Color Scan | × | ○ | ... |

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD

TECHNICAL FIELD

The disclosure herein discloses a communication device that executes a communication with a server.

BACKGROUND ART

A technique that shares one printer registered in a server for intermediating printing by a plurality of users is known.

SUMMARY

The disclosure herein discloses a new scheme for enabling a plurality of users having different account information for logging in to a server to share one communication device to cause the communication device and the server to execute a communication of target data with each other.

A communication device disclosed herein may comprise: a memory; and a controller configured to: receive an input of a registration instruction for registering information related to the communication device in a server, send a registration request including device identification information of the communication device to the server, in a case where the input of the registration instruction is received, wherein in the server, in a case where the device identification information included in the registration request received from the communication device is not registered in the server, the device identification information, account information, and communication authentication information may be registered in association with each other, the account information may be used for a login operation to the server by a user of the communication device, and the communication authentication information may be to be used by the communication device for a communication with the server; receive the communication authentication information associated with the device identification information from the server; store the communication authentication information received from the server in the memory; and execute a communication with the server by using the communication authentication information stored in the memory, wherein in a case where an input of a first registration instruction is received: a first registration request including first device identification information may be sent to the server, wherein in the server, the first device identification information, first account information used by a first user of the communication device for a login operation to the server, and first communication authentication information may be registered in association with each other; the first communication authentication information may be received from the server; and the first communication authentication information may be stored in the memory, wherein in a case where an input of a second registration instruction is received: a second registration request including second device identification information may be sent to the server, the second device identification information being different from the first device identification information, wherein in the server, the second device identification information, second account information used by a second user of the communication device for a login operation to the server, and second communication authentication information may be registered in association with each other, the second user being different from the first user, the second account information being different from the first account information, the second communication authentication information being different from the first communication authentication information; the second communication authentication information may be received from the server, and the second communication authentication information may be stored in the memory, wherein in a state where the first communication authentication information and the second communication authentication information are stored in the memory, the communication device may be configured to execute a communication with the server for the first user by using the first communication authentication information and execute a communication with the server for the second user by using the second communication authentication information, and wherein in a case where the login operation to the server by using the first account information is executed by the first user in a first terminal device and the first terminal device sends a first communication instruction to the server, the communication device may be configured to execute a communication of first target data with the server, and in a case where the login operation to the server by using the second account information is executed by the second user in a second terminal device and the second terminal device sends a second communication instruction to the server, the communication device may be configured to execute a communication of second target data with the server.

A method, and a non-transitory computer-readable recording medium storing the aforementioned computer-readable instructions are also novel and useful. Further, a communication system which comprises the aforementioned communication device and other device(s) (e.g., a terminal device and/or a server) is also novel and useful.

BRIEF DESCRIPTION OF THE DRAWINGS

FIG. 3 shows a user management table.

FIG. 4 shows a sequence diagram of a normal print process.

FIG. 5 shows a sequence diagram of a registration process.

FIG. 11 shows a user management table of a second embodiment.

EMBODIMENTS

First Embodiment

Figure 1:
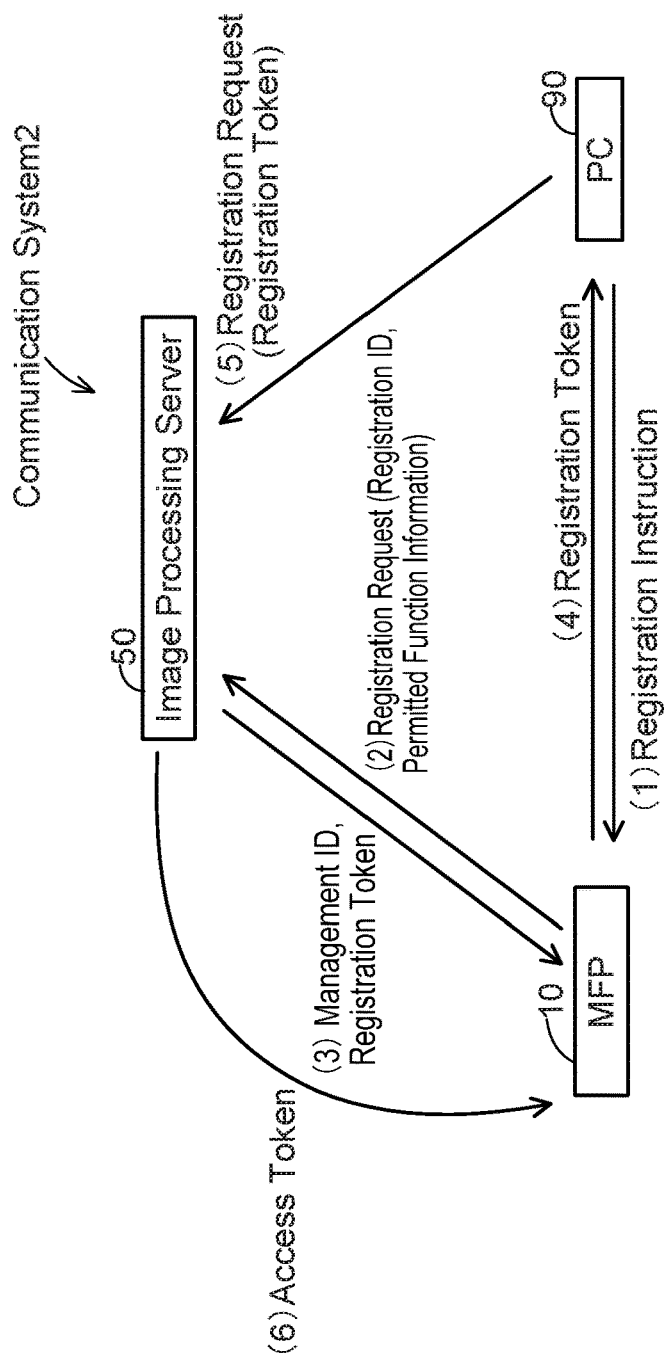
FIG. 1 shows an explanatory diagram for explaining an overview of an embodiment.

Embodiment Overview; FIG. 1

An overview of this embodiment will be described with reference to FIG. 1. A communication system 2 comprises a multi-function peripheral 10, an image processing server 50, and a PC (abbreviation of Personal Computer) 90. Hereinbelow, the multi-function peripheral 10 may be termed "MFP 10", and the image processing server 50 may simply be termed "server 50". The PC 90 is not provided with a printer driver, and thus it causes the MFP 10 to execute printing by using the server 50. To realize such a system, the MFP 10 needs to be registered in the server 50 in advance. Following processes (1) to (6) are executed to register the MFP 10 in the server 50.

(1) The MFP 10 receives an input of a registration instruction for registering the MFP 10 in the server 50 from the PC 90. In this case, (2) the MFP 10 sends a registration request including a registration ID and permitted function information to the server 50. The registration ID is information for identifying the MFP 10. The permitted function information is information for specifying one or more image processes of which use is permitted to a user of the MFP 10 among plural image processes that the MFP 10 is capable of executing.

(3) After having sent the registration request to the server 50, the MFP 10 receives a registration token and a management ID that is different from the registration ID from the server 50. The management ID is information for the server 50 to identify the MFP 10 in order to manage the MFP 10. Then, (4) the MFP 10 sends the registration token to the PC 90. As a result, (5) a registration request including the received registration token is sent from the PC 90 to the server 50. (6) The MFP 10 receives an access token from the server 50 after the registration request has been sent from the PC 90 to the server 50. When such a registration process is executed, information of the MFP 10 (such as the registration ID, the management ID, the permitted function information, and the access token) is registered in the server 50. According to this, the MFP 10 becomes capable of executing a communication of print data with the server 50 using the access token.

When the above registration process is executed, a user of the PC 90 can send an image file or the like representing a print target image from the PC 90 to the server 50. In this case, conversion of this image file to print data including a data format that can be interpreted by the MFP 10 is executed by the server 50, this print data is sent from the server 50 to the MFP 10, and printing according to the print data is executed by the MFP 10. As above, the user can cause the MFP 10 to execute printing using the server 50, despite the PC 90 not being provided with a primer driver.

Here, in the present embodiment, it is assumed that the MFP 10 is shared by plural users, and each of these plural users registers the same MFP 10 in the server 50. However, the server 50 of the present embodiment can only register one printer (which is the MFP 10 in this embodiment) for one registration ID. That is, in a case where the registration ID received from the MFP 10 in the above (2) is already registered in the server 50 (i.e., in a case where the MFP 10 is already registered), the server 50 does not register the MFP 10 by not sending the management ID and the registration token in the above (3). Thus, in the present embodiment, the MFP 10 executes processes of FIG. 5 and the like (to be described later) to enable the same MFP 10 to be registered in the server 50 for each of the plural users, as a result of which each user can cause the MFP 10 to execute printing using the server 50.

(Configuration of Communication System 2)

Figure 2:
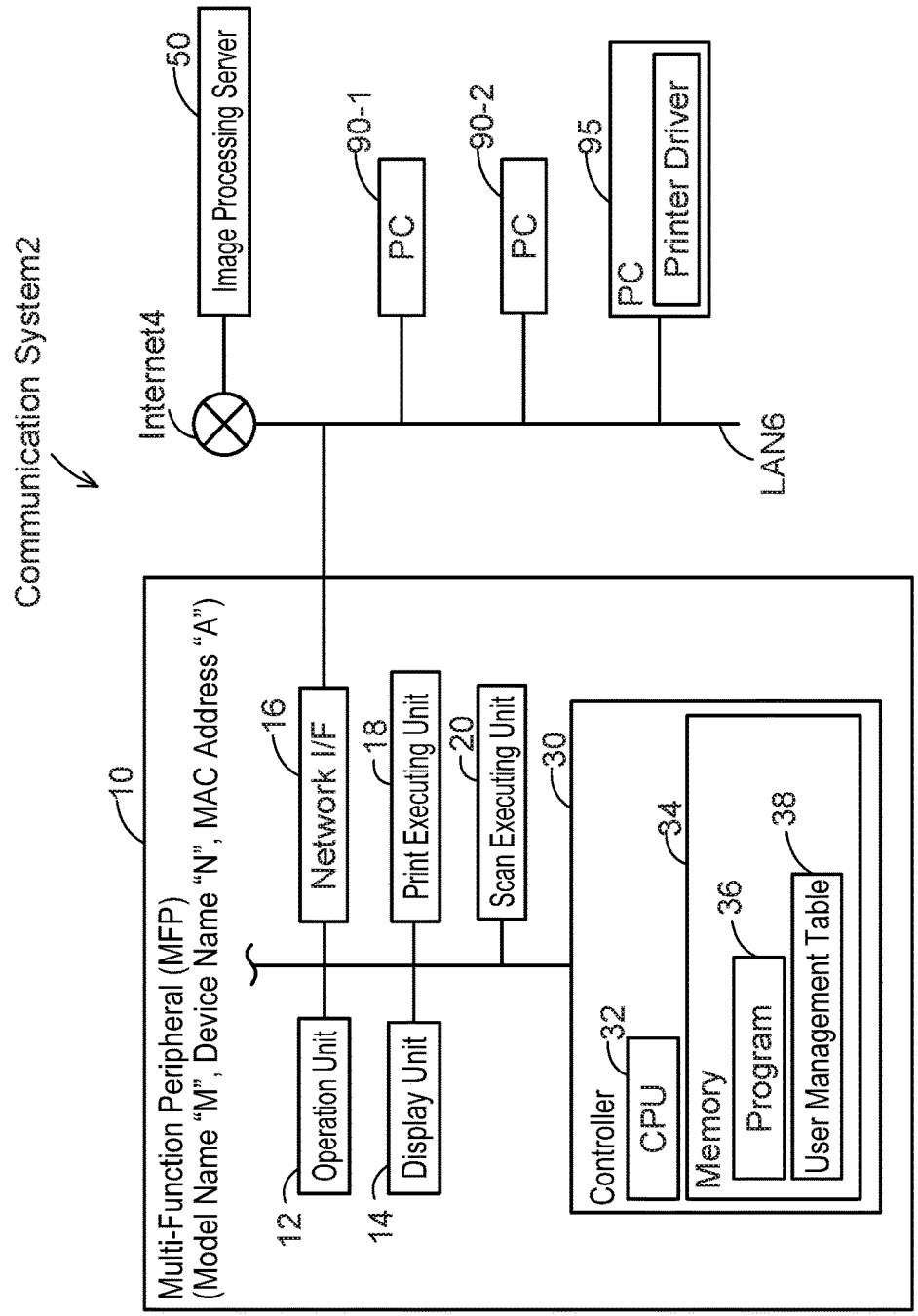
FIG. 2 shows a configuration of a communication system.

Next, a configuration of the communication system 2 will be described with reference to FIG. 2. The communication system 2 comprises the MFP 10, the image processing server 50, and a plurality of PCs 90-1, 90-2, 95. The MFP 10 and each of the PCs 90-1 and the like are connected to the Internet 4 via a LAN 6. The server 50 is connected to the Internet 4. Thus, the MFP 10 and each of the PCs 90-1 and the like can communicate with the server 50 via the Internet 4.

(Configuration of MFP 10)

The MFP 10 is a peripheral device capable of executing plural image processes (that is, it is a peripheral device of the PCs 90-1 and the like). The plural image processes include color print, monochrome print, color scan, and monochrome scan. The MFP 10 has a model name "M", a device name "N", and a MAC address "A". The MFP 10 comprises an operation unit 12, a display unit 14, a network interface 16, a print executing unit 18, a scan executing unit 20, and a controller 30. Each of the units 12 to 30 is connected to a bus line (not shown). Hereinbelow, an interface will be termed "I/F".

The operation unit 12 comprises a plurality of keys. The user can input various instructions to the MFP 10 by operating the operation unit 12. The display unit 14 is a display for displaying various types of information. The network I/F 16 is connected to the LAN 6. The print executing unit 18 comprises a printing mechanism of an inkjet scheme, a laser scheme, or the like. The scan executing unit 20 comprises a scanning mechanism such as CCD and CIS.

The controller 30 comprises a CPU 32 and a memory 34. The CPU 32 executes various processes according to a program 36 stored in the memory 34. The memory 34 is constituted of a volatile memory, a nonvolatile memory, and the like. The memory 34 further stores a user management table 38.

FIG. 3 shows an example of the user management table 38. A left side of FIG. 3 shows the table before the registration process is executed, and a right side thereof shows the table after the registration process has been executed. In the user management table 38, registration state information, login state information, a user ID, a password, account information, a registration ID, a management ID, a token, and image process limitation information are associated with each other for each of one or more users using the MFP 10. Hereinbelow, the user management table 38 may simply be termed "the table 38", and the image process limitation information may simply be termed "limitation information".

The user ID and the password are information for identifying a user, and are used by the user to log in to the MFP 10. For example, an administrator of the MFP 10 stores the user ID and the password for each user in the table 38. The account information is information used by the user in a login operation to the server 50. The registration ID is information for identifying the MFP 10, and is sent from the MFP 10 to the server 50 in the registration process to be described later. The management ID is information for the server 50 to identify the MFP 10 to manage the same, and is sent from the server 50 to the MFP 10 in the registration process to be described later. The management ID is different from the registration ID that is to be sent from the MFP 10 to the server 50. Further, the token is an access token used for the MFP 10 to execute a communication with the server 50.

The registration state information is information indicating one of "Registered" and "Unregistered", where "Registered" indicates that the MFP 10 has already been registered in the server 50, and "Unregistered" indicates that the MFP 10 is not yet registered in the server 50. The login state information is information indicating one of "Login" and "Logout", where "Login" indicates that the user is logging in the MFP 10, and "Logout" indicates that the user is not logging in the MFP 10.

The limitation information is information that specifies one or more image processes of which use is permitted to the user among the plural image processes that the MFP 10 can execute, which in other words is information that specifies one or more image processes of which use is not permitted to the user. "O" indicates that the use thereof is permitted, and "X" indicates that the use thereof is not permitted. For example, a user identified by a user ID "User1" is permitted to use the monochrome print, however, the user is not permitted to use the color print, the color scan, and the monochrome scan. Further, a user identified by a user ID "User2" is permitted to use all of the image processes. The administrator of the MFP 10 stores the limitation information in the table 38 for each user. The limitation information may include not only the image process(es) of which use is permitted to users, but also may include information related to printer paper size (such as A4) and a number of sheets to be printed that the users are permitted to use.

(Configuration of Image Processing Server 50)

The server 50 is a server installed on the Internet, and may for example be a GCP (abbreviation of Google Cloud Print) provided by Google (registered trademark). However, in a variant, the server 50 may for example be a server provided by a vendor of the MFP 10. The server 50 is a server for intermediating printing between the MFP 10 and the PCs 90-1 and the like. That is, the server 50 converts an image file submitted from the PC 90-1 for example, generates print data including a data format that can be interpreted by the MFP 10, and sends the print data to the MFP 10. Thus, the PCs 90-1 and the like can cause the MFP 10 to execute printing by submitting an image file to the server 50 even if they are not provided with a printer driver for converting the image file to the print data. The users of the MFP 10 register their account information (for example, Google Account) in the serer 50 in advance.

(Configuration of PCs 90-1 and the Like)

Each of the PCs 90-1, 90-2 does not include a print driver for causing the MFP 10 to execute printing, but the PC 95 includes a printer driver. Further, each of the PCs 90-1, 90-2 includes a browser program (not shown) such as Google Chrome (registered trademark), for example. Each of the PCs 90-1, 90-2, 95 in the present embodiment is a stationary terminal device (such as a desktop PC), however, in a variant, it may be a portable terminal device such as a cell phone (for example, a smartphone), a PDA, a laptop PC, and a tablet PC.

(Normal Print Process: FIG. 4)

Next, a normal print process executed between the MFP 10 and the PC 95 will be described with reference to FIG. 4. The normal print process is a process for causing the MFP 10 to execute printing by the PC 95 sending print data generated by its printer driver to the MFP 10. That is, the normal print process is a process for causing the MFP 10 to execute printing without involving the server 50. Hereinbelow, for the sake of easier understanding, operations executed by the CPU of each device (for example, the CPU 32 of the MFP 10) will be described with the corresponding device (for example, the MFP 10) as the subject, instead of describing the operations with the CPUs as the subject. Further, all of communications executed by the MFP 10 are executed via the network I/F 16. Therefore, the description "via the network I/F 16" will be omitted hereinbelow.

In T3, the user identified by the user ID "User1" (see FIG. 3) (who is hereafter termed "first user") performs a print operation on the PC 95. The print operation includes selecting an image file representing a print target, selecting a print setting (such as the monochrome print or the color print), and pressing a print button. In this case, the PC 95 converts the image file according to the print setting by using its printer driver and generates print data including a data format which can be interpreted by the MFP 10.

In T4, the PC 95 displays an input screen for inputting a user ID and a password. In T5, the PC 95 receives an input of the user ID "User1" and a password "P1" by the first user. Then, in T6, the PC 95 sends a print instruction to the MFP 10. The print instruction includes the user ID "User1" inputted in T5, the password "P1" inputted in T5, the converted print data, and the print setting selected in T3 (which is "monochrome" in the case shown in FIG. 4).

In T6, the MFP 10 receives the print instruction from the PC 95. In T7, the MFP 10 determines whether or not use of the image process according to the print setting included in the print instruction is permitted to the first user. Specifically, the MFP 10 firstly determines whether or not a combination of the user ID "User1" and the password "P1" included in the print instruction is registered in the table 38. In a case where this combination is not registered, the MFP 10 determines NO in T7 and does not execute printing. Further, in a case where this combination is registered, the MFP 10 specifies the limitation information associated with this combination from the table 38. Then, by using the specified limitation information, the MFP 10 determines whether or not the monochrome print, which is the image process according to the print setting "monochrome" included in the print instruction, is permitted. In the present embodiment, since the first user is permitted to use the monochrome print (see FIG. 3), the MFP 10 determines that the use of the monochrome print is permitted (YES in T7), and in T8 the MFP 10 supplies the print data included in the print instruction to the print executing unit 18 and instructs the print setting "monochrome" to the print executing unit 18. Due to this, the monochrome print of the image represented by the print data is executed by the print executing unit 18. On the other hand, in a case where it is determined that the image process according to the print setting included in the print instruction is not permitted (NO in T7), the MFP 10 does not execute printing.

Although not shown, execution of scan may be instructed by the first user to the PC 95, for example. In this case, the MFP 10 receives a scan instruction including the user ID "User1", the password "P1", and a scan setting (for example, the color scan) from the PC 95. Similarly to T7, the MFP 10 determines whether the image process according to the scan setting included in the scan instruction is permitted or not by using the limitation information associated with the user ID "User1" and the password "P1". In a case where this image process is not permitted, the MFP 10 does not execute scan, and in a case where this image process is permitted, the MFP 10 causes the scan executing unit 20 to execute scan. Then, the MFP 10 sends scan data to the PC 95.

As above, in the case where execution of the image process is instructed from the first user without involving the server 50 (T6), the MFP 10 executes the image process of which use is permitted to the first user and does not execute the image process of which use is not permitted to the first user based on the limitation information corresponding to the first user in the table 38. Due to this, only the image process permitted by the administrator can be utilized by the first user.

Figure 6:
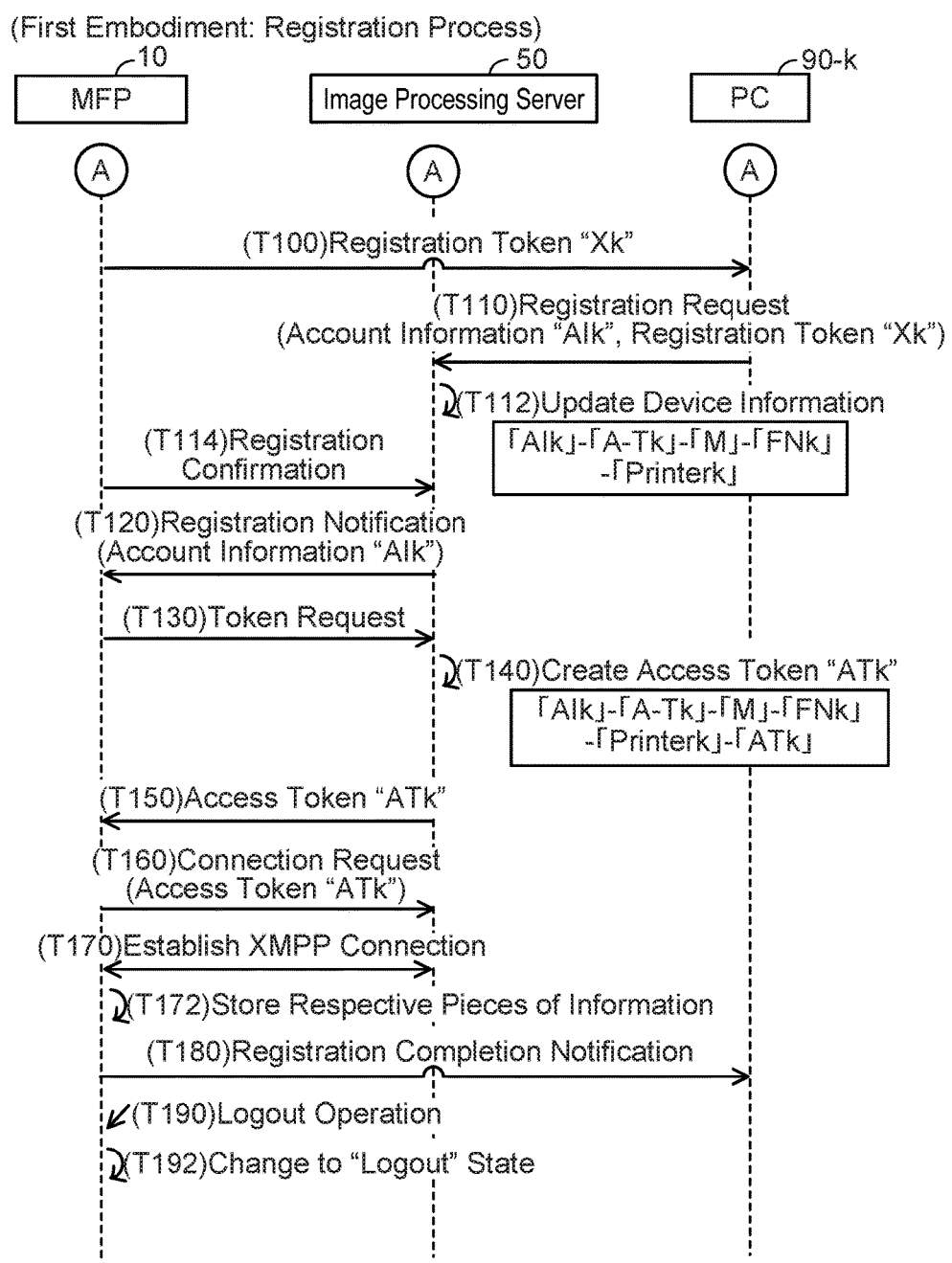
FIG. 6 shows a sequence diagram continued from FIG. 5.

(Registration Process: FIGS. 5 and 6)

Next, the registration process for registering the MFP 10 in the server 50 will be described with reference to FIGS. 5 and 6. A sign "k" in the drawings is either 1 or 2. For example, in a case of k=1, account information "AIk", a user ID "Userk", a password "Pk", and a PC 90-k mean "AI1", "User1", "P1", and the PC 90-1, respectively. Further, hereinbelow, a user that is identified by the user ID "Userk" will be termed "k-th user". Further, respective below-described processes executed by the PC 90-k are executed according to the browser program. Thus, hereinbelow, the description "according to the browser program" will be omitted.

In T10, the PC 90-k sends a login request including account information "AIk" to the server 50 in response to receiving, from the k-th user, an input of the account information "AIk" and an instruction to log in to the server 50.

The server 50 receives the login request from the PC 90-k in T10, and in a case where the account information "AIk" included in the login request is already registered, it sends predetermined screen data to the PC 90-k in T12. This predetermined screen data is screen data representing a predetermined screen including a search button for searching a printer existing near the PC 90-k.

The PC 90-k receives the predetermined screen data from the server 50 in T12, and then displays the predetermined screen represented by the predetermined screen data in T14. Then, in a case where the search button in the predetermined screen is selected by the k-th user in T16, the PC 90-k sends a search signal for searching for a printer to the LAN 6 by broadcast. The search signal is repeatedly sent over a predetermined period of time.

Meanwhile, in T20, the MFP 10 receives a login operation including an input of a user ID "Userk" and a password "Pk" to the operation unit 12 by the k-th user. In this case, in T22, the MFP 10 changes login state information associated with the user ID "Userk" and the password "Pk" in the table 38 from "Logout" to "Login". Due to this, login to the MFP 10 by the k-th user is completed.

In T32, the MFP 10 receives the search signal from the PC 90-k. In this case, in T33, the MFP 10 determines whether or not registration state information of the k-th user who is currently logging in the MFP 10 indicates "Unregistered". In a case of determining that the registration state information indicates "Unregistered" (YES in T33), the MFP 10 sends the device name "N" to the PC 90-k which is a sender of the search signal in T34. Further, in a case of determining that the registration state information indicates "Registered" (NO in T33), the MFP 10 does not send the device name "N" to the PC 90-k and terminates the registration process. As above, the MFP 10 does not send the device name "N", even if the search signal is received from the PC 90-k in the state where the user whose registration state information indicates "Registered" is logging in the MFP 10. Due to this, the registration process can be suppressed from being executed plural times for the same user.

In T36, the PC 90-k displays a search result including the device name "N" received from the MFP 10. In T40, the PC 90-k receives a selection of the device name "N" by the k-th user. In this case, in T42, the PC 90-k sends the MFP 10 a registration instruction including logged-in account information "AIk" by which the server 50 is currently logged in. The registration instruction is a command for instructing a registration in the server 50 to the MFP 10.

When the registration instruction including the account information "AIk" is received from the PC 90-k in T42, the MFP 10 displays a confirmation screen on the display unit 14 in T50. The confirmation screen includes a YES button indicating that the MFP 10 is to be registered in the server 50, and a NO button indicating that the MFP 10 is not to be registered in the server 50. In a case of receiving a selection of the YES button in the confirmation screen by the k-th user in T52, the MFP 10 creates a registration ID "A-Tk" in T54. The registration ID is a letter string including a combination of the MAC address "A" of the MFP 10 and current time "Tk". Since the registration ID "A-Tk" includes information regarding time, a registration ID created in response to a registration instruction received from the PC 90-1 at a certain timing is different from a registration ID created in response to a registration instruction received from the PC 90-2 at another timing. As above, since the MFP 10 creates a unique registration ID each time, a plurality of unique registration IDs does not need to be prepared in advance. In a variant, the MFP 10 may prepare a plurality of registration IDs in advance instead of creating the registration ID in T54, and one registration ID among the plurality of registration IDs may be acquired.

In T60, the MFP 10 sends a registration request to the server 50. The registration request is a command for requesting the server 50 to register the MFP 10 therein, and includes the registration ID "A-Tk" created in T54, the model name "M" of the MFP 10, and permitted function information "FNk" of the k-th user who is logging in the MFP 10. The permitted function information "FNk" is information that specifies one or more image processes related to printing of which use is permitted to the k-th user among the limitation information of the k-th user. For example, permitted function information "FN1" of the first user identified by the user ID "User1" is information indicating the monochrome print only, and permitted function information "FN2" of the second user identified by the user ID "User2" is information indicating the monochrome print and the color print (see FIG. 3).

When the registration request is received from the MFP 10 in T60, the server 50 determines in T70 whether or not the registration ID "A-Tk" included in this registration request is already registered therein. In the present case, the server 50 determines that the registration ID "A-Tk" has not yet been registered, and executes process of T72 and its subsequent processes. On the other hand, in a case of determining that the registration ID "A-Tk" has already been registered, the server 50 does not execute the process of T72 and its subsequent processes, and terminates the registration process.

In T72, the server 50 creates a management ID "Printerk" and a registration token "Xk". The server 50 creates unique management ID "Printerk" and registration token "Xk" so that they do not become identical to management IDs and registration tokens that were created in the past. In T74, the server 50 stores device information. The device information is information in which the respective pieces of information included in the registration request of T60 (that is, the registration ID "A-Tk", the model name "M", and the permitted function information "FNk"), the created management ID "Printerk", and the created registration token "Xk" are associated with each other. Further, in T80, the server 50 sends the management ID "Printerk" and the registration token "Xk" to the MFP 10.

In T80, the MFP 10 receives the management ID "Printerk" and the registration token "Xk" from the server 50. In this case, in T100 of FIG. 6, the MFP 10 sends the registration token "Xk" to the PC 90-k. In response to receiving the management ID "Printerk" and the registration token "Xk" from the server 50 in T80, the MFP 10 periodically sends, to the server 50, a registration confirmation (see T114 to be described later) for checking whether the registration of the account information "AIk" has been completed.

In a case of receiving the registration token "Xk" from the MFP 10 in T100, the PC 90-*k* sends a registration request including the account information "AIk" and the registration token "Xk" to the server 50 in T110. This registration request is a command for requesting the server 50 to register the account information "AIk".

When the registration request is received from the PC 90-*k* in T110, the server 50 determines in T112 whether or not the registration token "Xk" included in the registration request is identical to the registration token "Xk" stored in T74. In the present case, the server 50 determines that these registration tokens are identical to each other, and updates the device information. Specifically, the server 50 further stores the account information "AIk" included in the registration request in association with the respective pieces of information that were stored in T74. The registration token "Xk" is omitted from the device information shown in T112, since this registration token "Xk" is not used in following processes. Further, in T120, the server 50 sends a registration notification including the account information "AIk" to the MFP 10 as a response to the registration confirmation received from the MFP 10. The registration notification is information for notifying the MFP 10 that the registration of the account information "AIk" has been completed.

In a case of receiving the registration notification from the server 50 in T120, the MFP 10 sends a token request to the server 50 in T130. The token request is a command for requesting the server 50 to send an access token.

In a case of receiving the token request from the MFP 10 in T130, the server 50 creates an access token "ATk", which is a unique letter string, in T140. Further, the server 50 further stores the created access token "ATk" in association with the respective pieces of information updated in T112. Then, in T150, the server 50 sends the access token "ATk" to the MFP 10. The server 50 may further create a refresh token for creating a new access token when a valid period of the access token "ATk" expires, and may further send this refresh token to the MFP 10. Generally speaking, information by which the MFP 10 can be authenticated simply needs to be sent.

In a case of receiving the access token "ATk" from the server 50 in T150, the MFP 10 sends a connection request including the access token "ATk" to the server 50 in T160. The connection request is a command for requesting the server 50 to establish an XMPP (abbreviation of Extensible Messaging and Presence Protocol) connection, which is a so-called a full-time connection.

In a case of receiving the connection request from the MFP 10 in T160, the server 50 determines that the access token "ATk" included in the connection request is registered as the device information (see T140), and establishes the XMPP connection in T170. When the XMPP connection is established as above, the server 50 can send signals (such as a job notification in T290 of FIG. 7 to be described later) to the MFP 10 over a firewall of the LAN 6 by using the XMPP connection.

In T172, the MFP 10 stores the respective pieces of information in the table 38. Specifically, the account information "AIk" received in T42 of FIG. 5 (or in T120 of FIG. 6), the registration ID "A-Tk" created in T54, the management ID "Printerk" received in T80, and the access token "ATk" received in T150 of FIG. 6 are stored in association with the user ID "Userk" which is logging in the MFP 10 (see 1T20 of FIG. 5). The MFP 10 further changes the registration state information associated with the user ID "Userk" from "Unregistered" to "Registered".

In T180, the MFP 10 sends a registration completion notification to the PC 90-*k*. The registration completion notification is information indicating that the registration of the MFP 10 in the server 50 has been completed. In T190, the MFP 10 receives a logout operation in the operation unit 12 by the k-th user. In this case, in T192, the MFP 10 changes the login state information associated with the user ID "Userk" from "Login" to "Logout". When the process of T192 ends, the registration process is terminated.

For example, in a case where the first user uses the PC 90-1 to execute the aforementioned registration process (that is, in the case of k=1), account information "AI1", a registration ID "A-T1", a management ID "Printer1", and an access token "AT1" are registered in the table 38 in association with the user ID "User1" and the password "P1". Further, in the server 50, the account information "AI1", the registration ID "A-T1", the model name "M", the permitted function information "FN1", the management ID "Printer1", and the access token "AT1" are registered in association with each other.

Further, in a case where the second user uses the PC 90-2 to execute the aforementioned registration process (that is, in the case of k=2), account information "AI2", a registration ID "A-T2", a management ID "Printer2", and an access token "AT2" are registered in the table 38 in association with the user ID "User2" and the password "P2". Due to this, the right side of the table 38 in FIG. 3 is completed. Further, in the server 50, the account information "AI2", the registration ID "A-T2", the model name "M", the permitted function information "FN2", the management ID "Printer2", and the access token "AT2" are registered in association with each other.

As aforementioned, the MFP 10 sends the registration request including the registration ID "A-T1" to the server 50 for the first user (T60 in FIG. 5), and sends the registration request including the registration ID "A-T2", which is different from the registration ID "A-T1", to the server 50 for the second user. Due to this, both device information for the first user and device information for the second user are registered in the server 50 (T140 in FIG. 6). That is, despite the MFP 10 being one single printer, the server 50 registers the device information for the first user as information of a printer identified by the management ID "Printer1" (T140) and establishes an XMPP connection with this printer (that is, the MFP 10) (T170), and further registers the device information for the second user as information of another printer identified by the management ID "Printer2" (T140) and establishes an XMPP connection with this printer (that is, the MFP 10) (T170). In other words, the server 50 registers a plurality of device information for a plurality of users for one single MFP 10 (T140), and establishes a plurality of XMPP connections with this one single MFP 10 (T170).

Figure 7:
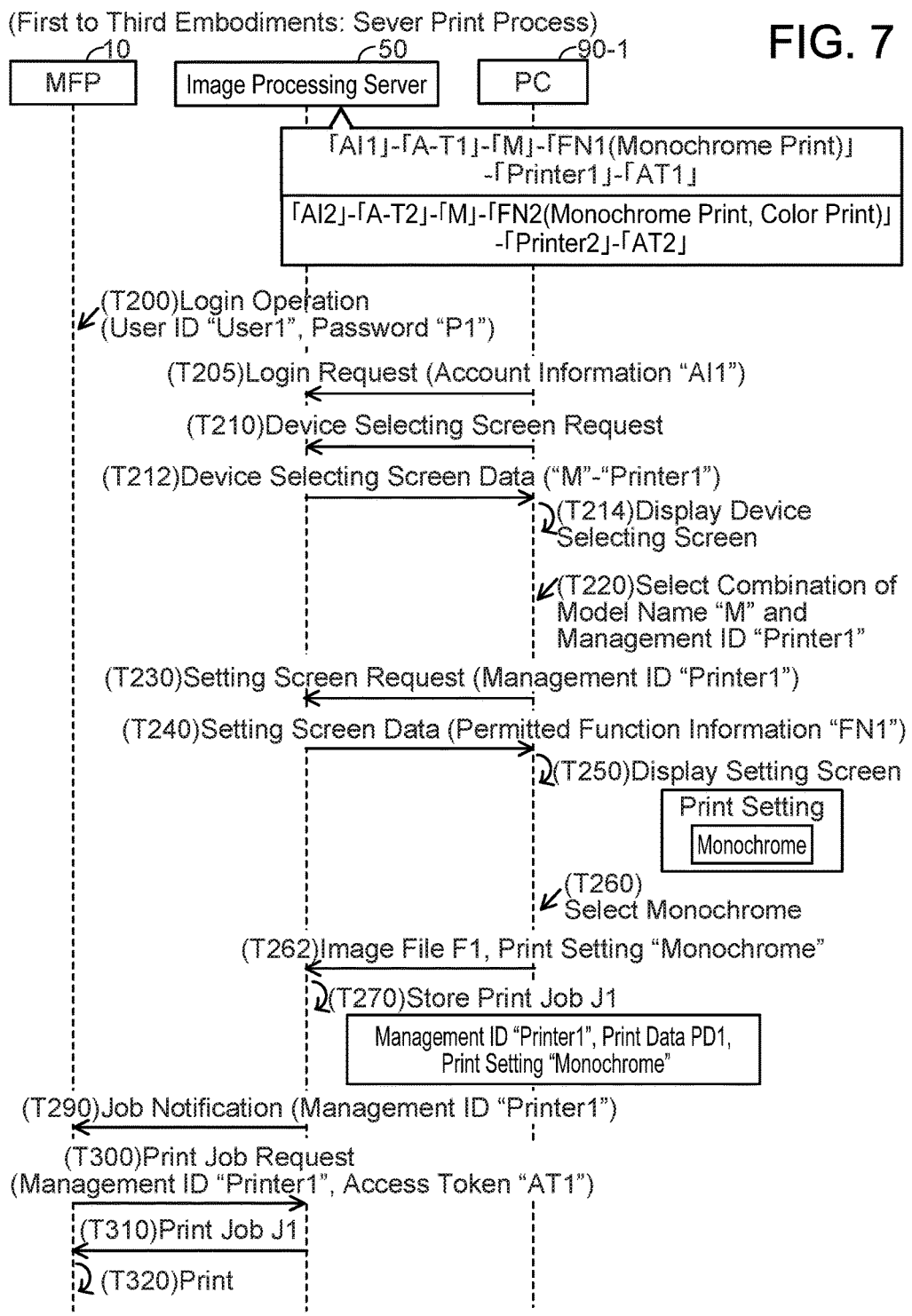
FIG. 7 shows a sequence diagram of a server print process.
Figure 8:
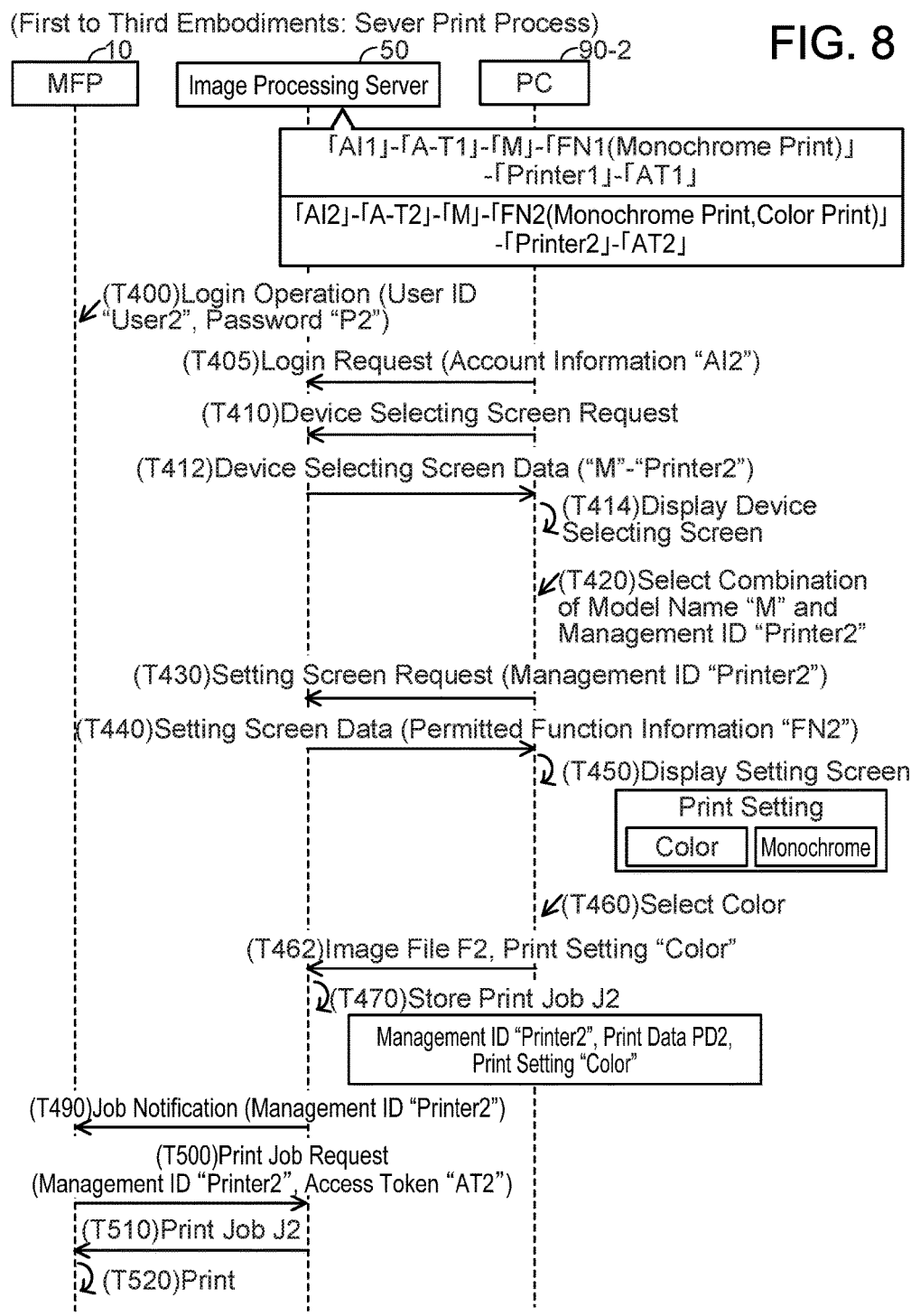
FIG. 8 shows a sequence diagram continued from FIG. 6.

(Server Print Process: FIGS. 7 and 8)

Next, a server print process for causing the MFP 10 to execute printing using the server 50 will be described with reference to FIGS. 7 and 8. Processes of FIGS. 7 and 8 are executed after the first and second users each have executed the aforementioned registration process and the MFP 10 has been registered in the server 50. Thus, the server 50 already has the device information for the first user (such as the account information "AI1", etc.) and the device information for the second user (such as the account information "AI2", etc.) registered therein. Firstly, a case where the first user causes the MFP 10 to execute printing from the PC 90-1 will be described with reference to FIG. 7.

In T200, the MFP 10 receives a login operation including an input of the user ID "User1" and the password "P1" from the first user. In this case, the MFP 10 changes the login state information associated with the user ID "User1" from "Logout" to "Login".

In response to receiving an input of the account information "AI1" from the first user, the PC 90-1 sends a login request including the account information "AI1" to the server 50 in T205, and in T210, it sends a device selecting screen request to the server 50. This request is a command for requesting the server 50 to send data representing a screen for selecting a device associated with the account information "AI1".

In a case of receiving the device selecting screen request from the PC 90-1 in T210, the server 50 specifies the device information including the account information "AI1" and sends device selecting screen data that indicates the model name "M" and the management ID "Printer1" included in the specified device information to the PC 90-1 in T212. In a case where the first user has registered another MFP, which is different from the MFP 10, in the server 50, the device selecting screen data further includes a model name and a management ID of this other MFP.

In a case of receiving the device selecting screen data from the server 50 in T212, the PC 90-1 displays a device selecting screen represented by this screen data in T214. In a case of receiving a selection of a combination of the model name "M" and the management ID "Printer1" in the device selecting screen from the first user in T220, the PC 90-1 sends a setting screen request including the management ID "Printer1" to the server 50 in T230. This request is a command for requesting the server 50 to send data representing a screen for selecting the print setting.

In a case of receiving the setting screen request from the PC 90-1 in T230, the server 50 specifies the permitted function information "FN1" associated with the management ID "Printer1" included in the setting screen request. The server 50 generates setting screen data representing a setting screen that allows a selection of the image process permitted in the permitted function information "FN1" (that is, the monochrome print), which is in other words a setting screen that prohibits a selection of image process(es) that are not permitted in the permitted function information "FN1" (that is, the color print). Then, the server 50 sends the generated setting screen data to the PC 90-1 in T240.

In a case of receiving the setting screen data in T240, the PC 90-1 displays a setting screen represented by the setting screen data in T250. This setting screen includes a button indicating the monochrome print, but does not include a button indicating the color print. In T260, the PC 90-1 receives a selection of the button indicating the monochrome print in the setting screen from the first user, and then receives a selection of an image file F1 representing a print target image. Then, in T262, the PC 90-1 sends the image file F1 and the print setting "monochrome" indicating the monochrome print to the server 50.

In a case of receiving the image file F1 and the print setting "monochrome" from the PC 90-1 in T262, the server 50 converts the image file F1 according to the print setting "monochrome" and generates print data PD1 in T270. Then, the server 50 stores a print job J1 including the management ID "Printer1" received in T230, the generated print data PD1, and the print setting "monochrome" received in T262. Then, in T290, the server 50 sends a job notification including the management ID "Printer1" to the MFP 10 by using the XMPP connection (see T170 of FIG. 6). The job notification is information for notifying the MFP 10 that the print job J1 has been stored.

In a case of receiving the job notification from the server 50 in T290, the MFP 10 determines that the login state information associated with the management ID "Printer1" included in this job notification is "Login" in the table 38 (see T200). In this case, in T300, the MFP 10 sends a print job request to the server 50. The print job request is a command for requesting the server 50 to send the print job J1, and includes the management ID "Printer1" and the access token "AT1" associated with the management ID "Printer1" in the table 38.

In a case of receiving the print job request from the MFP 10 in T300, the server 50 specifies the device information including the management ID "Printer1" in the print job request, and specifies the access token "AT1" in the specified device information. Then, the server 50 determines whether or not the specified access token "AT1" is identical to the access token "AT1" in the print job request. In the present case, since these access tokens are identical to each other, the server 50 sends the print job J1 including the management ID "Printer1" to the MFP 10 in T310. In a case where the access tokens are not identical to each other, the server 50 does not send the print job J1 to the MFP 10.

In a case of receiving the print job J1 from the server 50 in T310, the MFP 10 executes printing according to the print job J1 in T320. Specifically, the MFP 10 supplies the print data PD1 in the print job J1 to the print executing unit 18, and instructs the print setting "monochrome" to the print executing unit 18. Due to this, the monochrome printing of the image represented by the print data is executed by the print executing unit 18. When the process of T320 ends, the server print process of FIG. 7 is terminated.

Here, a comparative example in which the MFP 10 periodically sends the print job request including the management ID "Printer1" and the access token "AT1" to the server 50 in response to the first user logging in in T200 will be considered. In this case, in a case where the server 50 receives the print job request from the MFP 10 after having stored the print job J1 including the management ID "Printer1", it sends the print job J1 to the MFP 10. Since the server 50 can send the print job J1 to the MFP 10 as a response to the print job request, the job notification does not need to be sent to the MFP 10 using the XMPP connection. However, in the configuration of the comparative example, the print job request is periodically sent from the MFP 10 to the server 50 during a period of time from when the first user logs in to the MFP 10 until when the print job J1 is stored in the server 50 (that is, during a period between T200 to T270), and thus, a communication load between the MFP 10 and the server 50 is large. Contrary to this, in the present embodiment, the MFP 10 sends the print job request to the server 50 (T300) in response to receiving the job notification from the server 50 (T290), and thus the print job request does not have to be sent periodically. As a result, the communication load between the MFP 10 and the server 50 can be reduced. In a variant, the configuration of the above comparative example may be employed. That is, in T170 of FIG. 6, the XMPP connection does not have to be established.

Next, a case where the second user causes the MFP 10 to execute printing from the PC 90-2 will be described with reference to FIG. 8. T400 to T440 of FIG. 8 are the same as T200 to T240 of FIG. 7 except that the PC 90-2, the user ID "User2", the password "P2", the account information "AI2", the management ID "Printer2", and the permitted function information "FN2" are used instead.

In T450, the PC 90-2 displays a setting screen represented by the setting screen data. This setting screen includes buttons respectively indicating the monochrome print and the color print specified by the permitted function information "FN2". In T460, the PC 90-2 receives a selection of the button indicating the color print from the second user, and then receives a selection of an image file F2. Then, in T462, the PC 90-2 sends the image file F2 and the print setting "color" to the server 50.

In a case of receiving the image file F2 and the print setting "color" from the PC 90-2 in T462, the server 50 converts the image file F2 according to the print setting "color" and generates print data PD2 in T470. Then, the server 50 stores a print job J2 including the management ID "Printer2" received in T430, the generated print data PD2, and the print setting "color" received in T462. Then, in T490, the server 50 sends a job notification including the management ID "Printer2" to the MFP 10 by using the XMPP connection.

T500 to T520 are the same as T300 to T320 of FIG. 7 except that the management ID "Printer2", the access token "AT2", and the print job J2 are used instead. When the process of T520 ends, the server print process of FIG. 8 is terminated.

As above, in the present embodiment, the device information for the first user registered in the server 50 includes the permitted function information FN1 corresponding to the image process limitation information (see FIG. 3) of the first user. Instead of this, a configuration of a comparative example in which permitted function information indicating both the color print and the monochrome print that the MFP 10 is capable of executing is registered in the server 50, regardless of whose device information being registered in the server 50 will be considered. In this case, in T250 of FIG. 7, a setting screen including the buttons that respectively indicate the color print and the monochrome print is displayed, and thus the color print may be selected by the first user. Thus, in T310, the print job J1 including the print setting of the color print is sent to the MFP 10, by which the color printing may be executed despite the use of the color print not being permitted to the first user. Contrary to this, in the present embodiment, since the device information for the first user registered in the server 50 includes the permitted function information FN1 indicating only the monochrome print, the setting screen including only the button for the monochrome print is displayed in T250. Thus, an incident in which the color print is selected by the first user does not happen, and the color print, of which use is not permitted to the first user, can be suppressed from being executed in the MFP 10. Meanwhile, the device information for the second user registered in the server 50 includes the permitted function information FN2 corresponding to the image process limitation information (see FIG. 3) of the second user. Thus, in T450 of FIG. 8, the setting screen including the buttons for both the color print and the monochrome print is displayed. Thus, the second user can select desired one of the color print and the monochrome print. As above, since a setting screen corresponding to each user's image process limitation information is displayed, the MFP 10 can be caused to execute an image process customized for each user.

Figure 9:
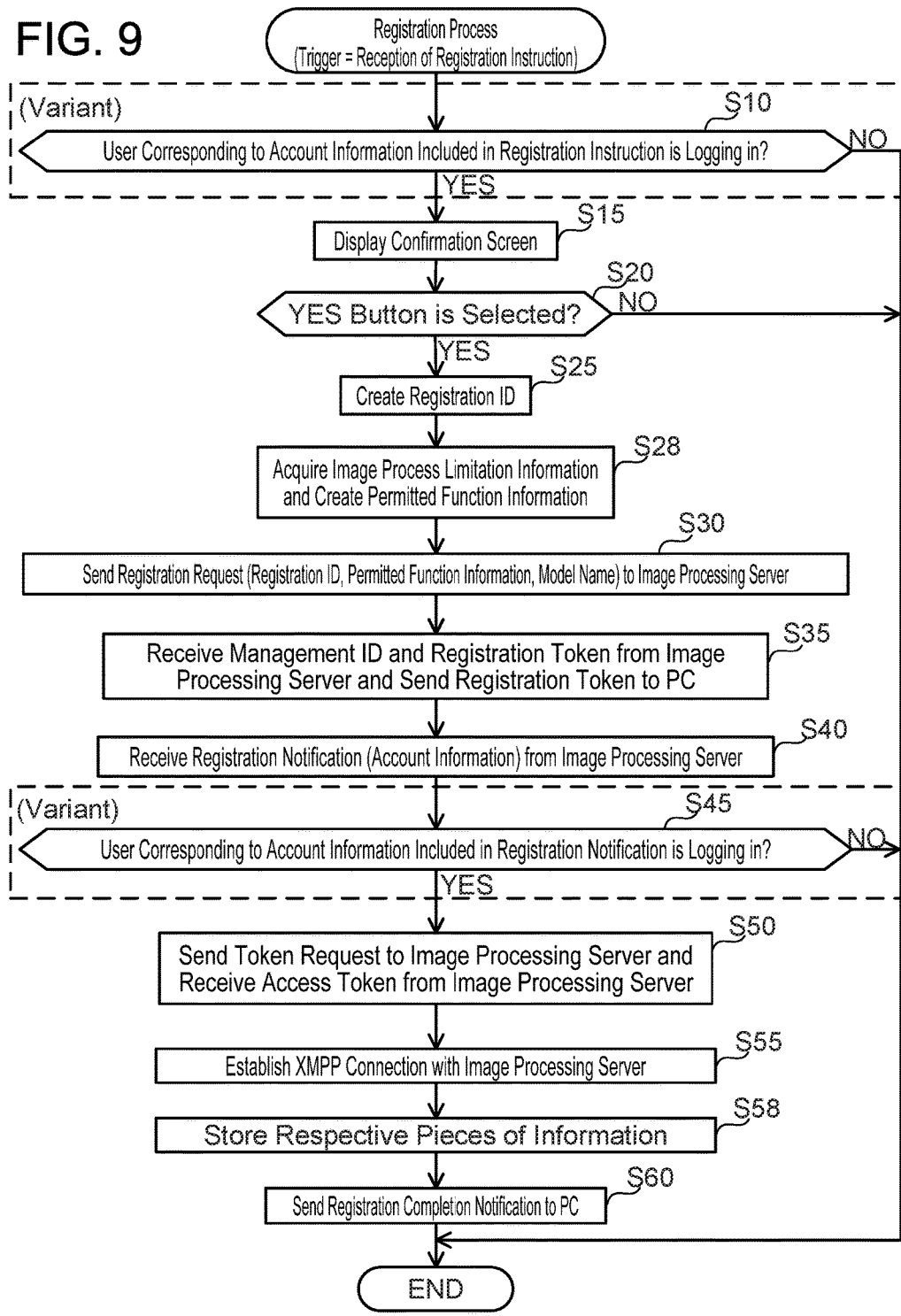
FIG. 9 shows a flow chart of the registration process.

(Registration Process of MFP 10: FIG. 9)

Next, a process executed by the CPU 32 of the MFP 10 for realizing the registration process of FIGS. 5 and 6 will be described with reference to FIG. 9. The CPU 32 executes the process of FIG. 9 in response to receiving the registration instruction including the logged-in account information from one of the PCs (see T42 of FIG. 5). Hereinbelow, the PC being the sender of the registration instruction will be termed "target PC". S10 and S45 enclosed with broken lines in FIG. 9 are not executed in this embodiment, but are executed in a variant to be described later.

In S15, the CPU 32 causes the display unit 14 to display the confirmation screen for checking with the user as to the registration of the MFP 10 in the server 50 (T50 of FIG. 5). In S20, the CPU 32 monitors whether the YES button included in the confirmation screen is selected by the user. In the case where the YES button is selected by the user (T52), the CPU 32 determines YES in S20 and proceeds to S25. On the other hand, in a case where the NO button is selected by the user, the CPU 32 determines NO in S20 and terminates the process of FIG. 9. In a variant, in a case of receiving the registration instruction from the target PC, the CPU 32 may execute the process of S25 without executing the processes of S15 and S20.

In S25, the CPU 32 creates the registration ID including the combination of the MAC address "A" of the MFP 10 and the current time (T54). In a variant, the CPU 32 may create a registration ID including a randomly created letter string. In S28, the CPU 32 acquires the limitation information associated with the login state information "Login" in the table 38, and creates the permitted function information indicating the image process(es) (such as the monochrome print) related to printing permitted in the acquired limitation information. In S30, the CPU 32 sends the registration request including the registration ID created in S25, the permitted function information created in S28, and the model name "M" to the server 50 (T60).

In S35, the CPU 32 receives the management ID and the registration token from the server 50 (T80), and sends this registration token to the target PC (T100 of FIG. 6). Further, the CPU 32 starts to periodically send the confirmation request to the server 50. In S40, the CPU 32 receives the registration notification including the logged-in account information from the server 50 (T120). In S50, the CPU 32 sends the token request to the server 50 (T130), and receives the access token from the server 50 (T150). Then, in S55, the CPU 32 establishes the XMPP connection with the server 50 (T170) by using the received access token.

In S58, the CPU 32 stores the respective pieces of information in the memory 34 in association with the login state information "Login" (T172). Specifically, the CPU 32 stores the registration ID created in S25, the management ID received in S35, the account information included in the registration instruction (that is, the account information received in S40) which is the trigger of the process of FIG. 9, the access token received in S50, and the registration state information "Registered". In S60, the CPU 32 sends the registration completion notification to the target PC (T180). When S60 ends, the process of FIG. 9 is terminated.

Figure 10:
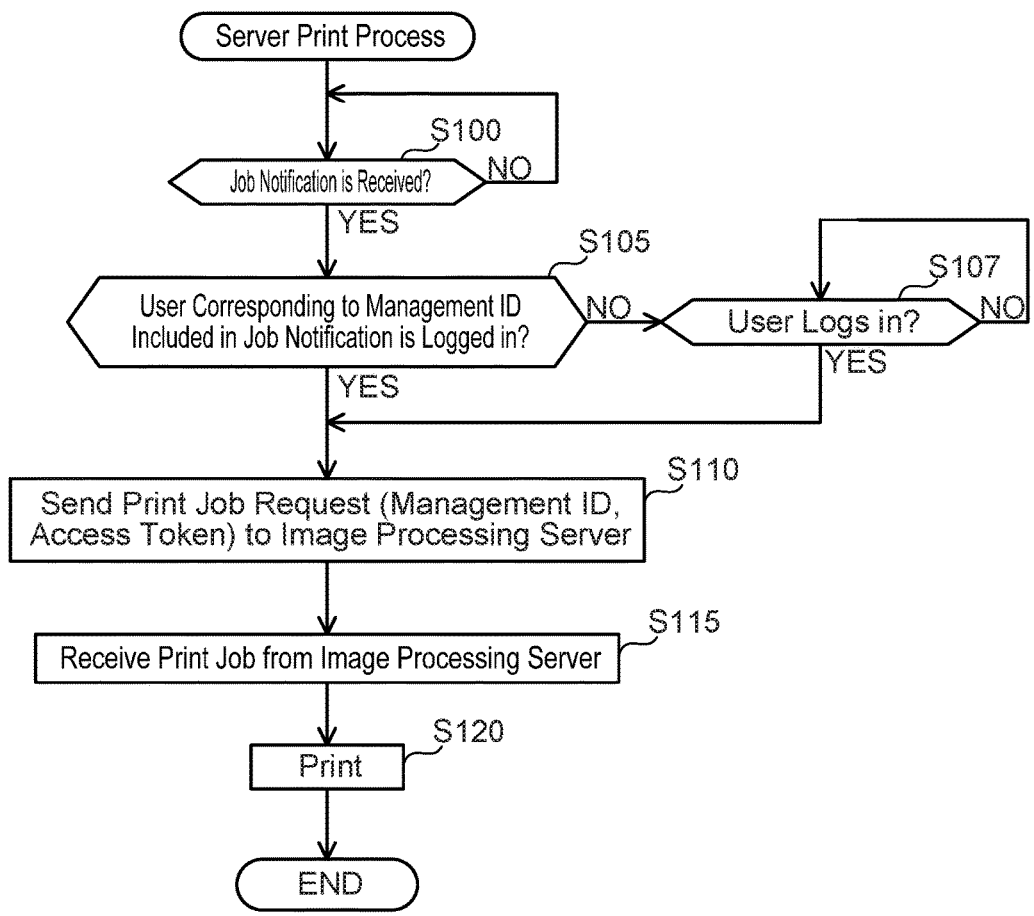
FIG. 10 shows a flow chart of the server print process.

(Server Print Process of MFP 10: FIG. 10)

Next, a process executed by the CPU 32 of the MFP 10 for realizing the server print process of FIGS. 7 and 8 will be described with reference to FIG. 10. The CPU 32 starts the process of FIG. 10 with a power of the MFP 10 being turned on as the trigger.

In S100, the CPU 32 monitors whether the job notification is received from the server 50. In the case of receiving the job notification (YES in S100, T290 of FIG. 7, and T490 of FIG. 8), the CPU 32 proceeds to S105.

In S105, the CPU 32 determines whether or not the user corresponding to the management ID included in the received job notification (hereinbelow termed "corresponding user") is logging in. Specifically, the CPU 32 firstly determines whether or not the login state information "Login" exists in the table 38. In a case where the login state information "Login" does not exist, the CPU 32 determines that the corresponding user is not logging in (NO in S105), and proceeds to S107. In a case where the login state information "Login" exists, the CPU 32 determines whether or not the management ID associated with the login state information "Login" is identical to the management ID included in the job notification. In the case where the two management IDs are identical to each other, the CPU 32 determines that the corresponding user is logging in (YES in S105) and proceeds to S110, whereas in the case where the two management IDs are not identical to each other, the CPU 32 determines that the corresponding user is not logging in (NO in S105), and proceeds to S107. As above, in the case where the two management IDs are not identical to each other, the print process of S110 and its subsequent processes are not executed. Due to this, a third party different from the corresponding user can be prevented from taking away a print medium printed according to the instruction from the corresponding user.

In S107, the CPU 32 monitors whether the corresponding user logs in. In the case of receiving the input of the user ID and the password associated with the management ID included in the job notification received in S100, the CPU 32 determines that the corresponding user logs in (YES in S107), and proceeds to S110.

In S110, the CPU 32 sends the print job request including the management ID included in the job notification received in S100 and the access token associated with this management ID in the table 38 to the server 50 (T300 of FIG. 7, T500 of FIG. 8). In S115, the CPU 32 receives the print job from the server 50 (T310 of FIG. 7, T510 of FIG. 8). Then, in S120, the CPU 32 causes the print executing unit 18 to execute printing according to the print data included in the received print job (T320 of FIG. 7, T520 of FIG. 8). When the process of S120 ends, the process of FIG. 10 is terminated.

Effects of Embodiment

In the case of receiving the input of the registration instruction from the PC 90-1 (T42 of FIG. 5), the MFP 10 sends the registration request including the registration ID "A-T1" to the server 50 (T60), as a result of which the registration ID "A-T1", the account information "AI1", and the access token "AT1" are registered in association with each other in the server 50 (T140 of FIG. 6). Further, in the case of receiving the input of the registration instruction from the PC 90-2 (T42 of FIG. 5), the MFP 10 sends the registration including the registration ID "A-T2", which is different from the registration ID "A-T1" (T60), as a result of which the registration ID "A-T2", the account information "AI2", and the access token "AT2" are registered in association with each other in the server 50 (T140 of FIG. 6). In the state of having both the access token "AT1" and the access token "AT2" stored in the memory 34, the MFP 10 is capable of executing a communication for the first user with the server 50 using the access token "AT1" as well as a communication for the second user with the server 50 using the access token "AT2" (T160, T170). Thus, the MFP 10 can communicate the print data PD1 with the server 50 (T300, T310) in the case where the login to the server 50 using the account information "AI1" is performed by the first user from the PC 90-1 (T205 of FIG. 7), and the setting screen request, the image file F1, and the print setting "monochrome" are sent to the server 50 from the PC 90-1 (T230, T262). Further, the MFP 10 can communicate the print data PD2 with the server 50 (T500, T510) in the case where the login to the server 50 using the account information "AI2" is performed by the second user from the PC 90-2 (T405 of FIG. 8), and the setting screen request, the image file F2, and the print setting "color" are sent to the server 50 from the PC 90-2 (T430, T462). Thus, the first and second users can share one MFP 10 to cause the MFP 10 to execute communication of the print data with the server 50.

Further, for example, a configuration of a comparative example in which the administrator of the MFP 10 registers, in the server 50, the account information of each of the plurality of users who can share the MFP 10 in association with account information of the administrator and identification information of the MFP 10 will be considered. In the configuration of this comparative example as well, the plurality of users can share one MFP 10 to cause it to execute the communication of the print data with the server 50. However, if the configuration in which certain account information is registered in the server 50 in association with another account information and the identification information of the MFP 10 is employed, the printing using the MFP 10 becomes inexecutable by using the certain account information in the event where the other account information is deregistered. Contrary to this, in the present embodiment, the MFP 10 sends the server 50 the registration request including the registration ID "A-T1" corresponding to the first user, and sends the server 50 the registration request including the registration ID "A-T2" corresponding to the second user, which differs from the registration ID "A-T1". Due to this, both the first and second users can register the same MFP 10 in the server 50 in association with their own account information. Due to this, for example, even if the first user deregisters its account information, the second user is not influenced thereby, and can cause the MFP 10 to execute printing by using the server 50.

(Corresponding Relationships)

The MFP 10, the image processing server 50, the PC 90-1, and the PC 90-2 are an example of "communication device", "server", "first terminal device", and "second terminal device", respectively. The registration ID, the access token, the management ID, and the user ID are an example of "device identification information", "communication authentication information", "management identification information", and "user information", respectively. The registration ID "A-T1", the account information "AI1", the access token "AT1", and the print data PD1 are an example of "first device identification information", "first account information", "first communication authentication information", and "first target data", respectively. The registration ID "A-T2", the account information "AI2", the access token "AT2", and the print data PD2 are an example of "second device identification information", "second account information", "second communication authentication information", and "second target data", respectively.

The respective pieces of information sent in T230 and T262 of FIG. 7 and the job notification received in T290 are an example of "first communication instruction" and "first execution instruction", respectively. The respective pieces of information sent in T430 and T462 of FIG. 8 and the job notification received in T490 are an example of "second communication instruction" and "second execution instruction", respectively. The management ID "Printer1" and the management ID "Printer2" are an example of "first management identification information" and "second management identification information", respectively. The user ID "User1" and the user ID "User2" are an example of "first user information" and "second user information", respectively. The registration token "Xk" is an example of "registration authentication information". The registration state information "Registered" is an example of "completion information". The predetermined screen displayed in T14 and the search screen displayed in T36 are examples of "predetermined screen". The image process limitation information corresponding to the first user, the image process limitation information corresponding to the second user, the permitted function information "FN1", and the permitted function information "FN2" are an example of "first process specifying information", "second process specifying information", "third process specifying information", and "fourth process specifying information", respectively. The printing executed in T8 of FIG. 4, the monochrome print selected in T260 of FIG. 7, the print setting "monochrome", the color print selected in T460 of FIG. 8, and the print setting "color" are an example of "target image process", "first image process", "first setting information", "second image process", and "second setting information", respectively.

The process of T42 of FIG. 5 is an example of "receive an input of a registration instruction". The processes of S30, S50, and S58 of FIG. 9 are an example of "send a registration request", "receive communication authentication information", and "store the communication authentication information", respectively. The process of S115 of FIG. 10 is an example of "execute a communication".

The process of S35 of FIG. 9 is an example of "receive management identification information", "receive registration authentication information", and "send the registration authentication information". The processes of T20 of FIG. 5, T200 of FIG. 7, and T400 of FIG. 8 are examples of "receive an input of user information". The processes of T33 and T34 are an example of "determine whether completion information is stored in association with the target user information in the memory" and "send a device name", respectively. The processes of T7 of FIG. 4 and S28 of FIG. 9 are an example of "cause the image process executing unit to execute a target image process" and "acquire first (or second) process specifying information", respectively. The processes of T320 of FIG. 7 and T520 of FIG. 8 are examples of "to cause the image process executing unit to execute the second image process".

Figure 12:
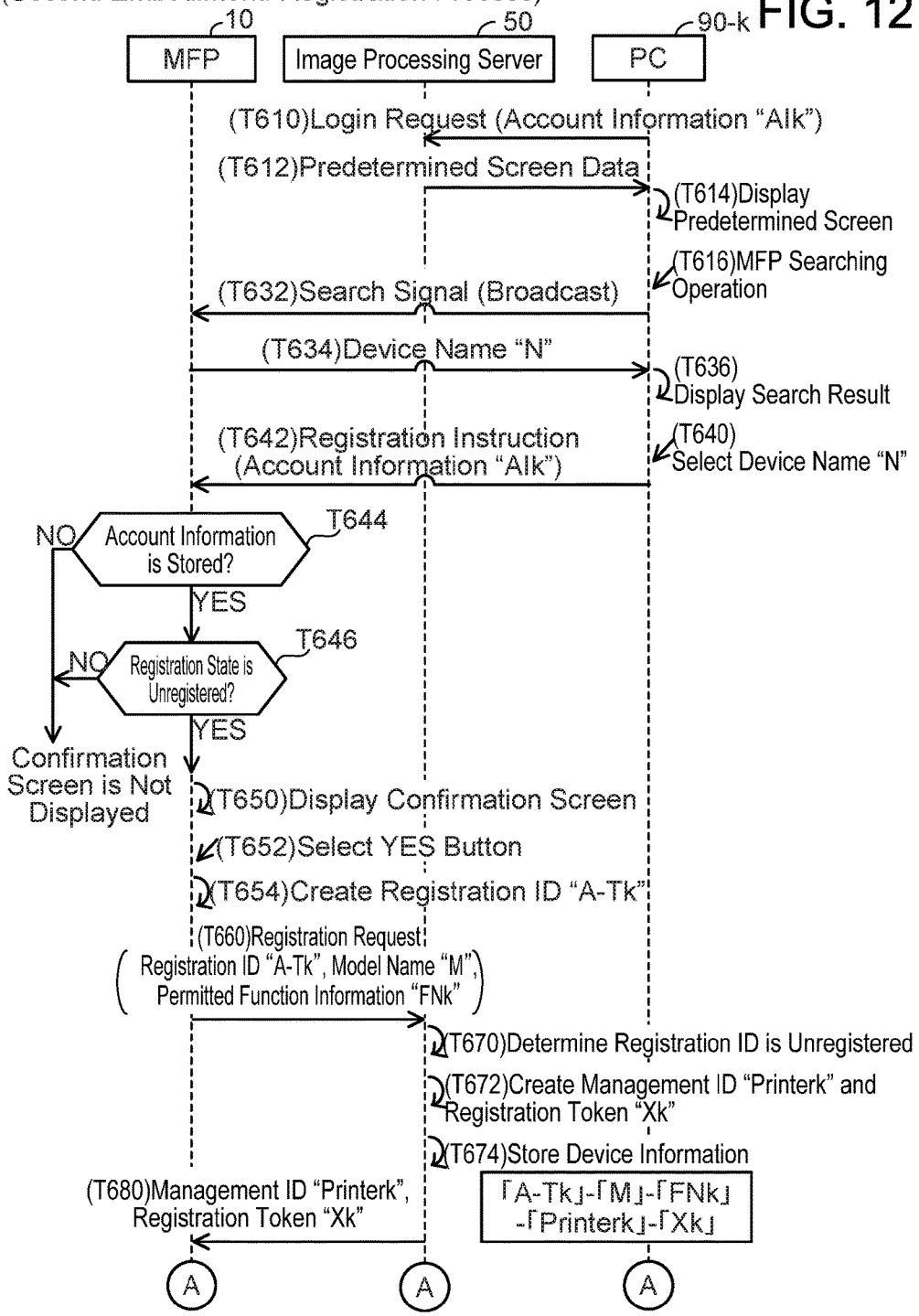
FIG. 12 shows a sequence diagram of a registration process of the second embodiment.

Second Embodiment: FIGS. 11 and 12

Next, a second embodiment will be described with reference to FIGS. 11 and 12. The second embodiment, as shown in FIG. 11, differs from the first embodiment in that the administrator of the MFP 10 stores the account information of the respective users in the table 38 in advance. Further, a registration process of FIG. 12 is executed instead of the registration process of FIG. 5.

T610 to T642 of FIG. 12 are the same as T10 to T42 of FIG. 5. However, in the present embodiment, processes corresponding to T20, T22, and T33 of FIG. 5 are not executed. That is, in the present embodiment, the MFP 10 receives the registration instruction including the logged-in account information "AIk" by which the server 50 is currently logged in from the PC 90-k in T642 in a state where the k-th user is not logging in the MFP 10.

In T644, the MFP 10 determines whether or not the logged-in account information "AIk" included in the received registration instruction is stored in the table 38. In a case of determining that the logged-in account information "AIk" is stored in the table 38 (YES in T644), the MFP 10 proceeds to T646. On the other hand, in a case of determining that the logged-in account information "AIk" is not stored in the table 38 (NO in T644), the MFP 10 displays a screen indicating that use of the MFP 10 is not permitted on the display unit 14, and terminates the registration process. Due to this, since the registration request is not sent to the server 50, the registration process can be prevented from being executed for a user whose account information is not stored in the table 38, that is, for a user who is not permitted to use the MFP 10.

In T646, the MFP 10 determines whether or not the registration state information associated with the logged-in account information "AIk" in the table 38 indicates "Unregistered". In a case of determining that the registration state information indicates "Unregistered" (YES in T646), the MFP 10 displays the confirmation screen on the display unit 14 in T650. On the other hand, in a case of determining that the registration state information indicates "Registered" (NO in T646), the MFP 10 does not display the confirmation screen on the display unit 14, and terminates the registration process. Due to this, the registration process can be prevented from being executed plural times by the same user.

T652 to T680 are the same as T52 to T80 of FIG. 5. When the process of T680 ends, the process of FIG. 12 is terminated, and then the process of T100 of FIG. 6 and its subsequent processes are executed. As a result, the registration of the MFP 10 in the server 50 is completed.

According to the present embodiment, the user does not have to log in to the MFP 10 in the registration process (that is, T20 of FIG. 5 is not necessary). Convenience for the user can be improved. In the present embodiment, the process of T642 is an example of "receive an input of a registration instruction". The processes of T644 and T646 are an example of "determine whether the logged-in account information included in the registration instruction is stored in the memory", and "determine whether completion information is stored in association with the logged-in account information in the memory", respectively.

Variant of First and Second Embodiments: FIG. 9

A variant of the first and second embodiments will be described with reference to FIG. 9. In this variant, the administrator of the MFP 10 stores the account information of the respective users in the table 38 in advance, similarly to the second embodiment. Further, similarly to the first embodiment, the users log in to the MFP 10 before executing the registration process (T20 of FIG. 5).

In S10, the CPU 32 determines whether or not the user corresponding to the account information included in the registration instruction received from the PC 90-k is logging in the MFP 10. Specifically, the CPU 32 determines whether the account information associated with the login state information "Login" in the table 38 is identical to the account information included in the registration instruction or not. In a case of determining that these two pieces of account information are identical to each other (YES in S10), the CPU 32 proceeds to S15, whereas in a case of determining that these two pieces of account information are not identical to each other (NO in S10), the process of FIG. 9 is terminated without executing S15 and its subsequent processes. SI 5 to S40 are the same as in the first embodiment.

In S45, the CPU 32 determines whether or not the user corresponding to the account information included in the registration notification received in S40 is logging in the MFP 10. Specifically, the CPU 32 determines whether the account information associated with the login state information "Login" in the table 38 is identical to the account information included in the registration notification or not. In a case of determining that these two pieces of account information are identical to each other (YES in S45), the CPU 32 proceeds to S50, whereas in a case of determining that these two pieces of account information are not identical to each other (NO in S45), the process of FIG. 9 is terminated without executing S50 and its subsequent processes. S50 to S60 are the same as in the first embodiment.

For example, a situation in which the first user is logging in the server 50, and the second user is logging in the MFP 10 will be considered. In such a case, if the processes of S10 and S45 are not executed, the information for the second user might be registered in the server 50 in association with the account information "AI1" of the first user (see T112 of FIG. 6), and the information for the first user might be stored in the table 38 in association with the user ID "User2" of the second user (S58). In the present variant, the registration request is not sent to the server 50 in the case of determining NO in S10 (that is, S30 and S35 are not executed), and thus information for a certain user is prevented from being registered in the server 50 in association with the account information of another user. Further, in the case of determining NO in S45, the token request is not sent to the server 50 (that is, S50 to S58 are not executed), and thus information for a certain user is prevented from being stored in the table 38 in association with the user ID of another user.

In this variant, the account information "AIk" associated with the user ID "Userk" and the account information "AIk" included in the registration instruction of T42 are an example of "target account information" and "logged-in account information", respectively. The token request of S50 is an example of "sending request". The process of S10 of FIG. 9 is an example of "determine whether target account information associated with the target user information in the memory is identical to the logged-in account information included in the registration instruction". The processes of S40 and S45 are an example of "receive logged-in account information" and "determine whether target account information associated with the target user information in the memory is identical to the logged-in account information", respectively.

Figure 13:
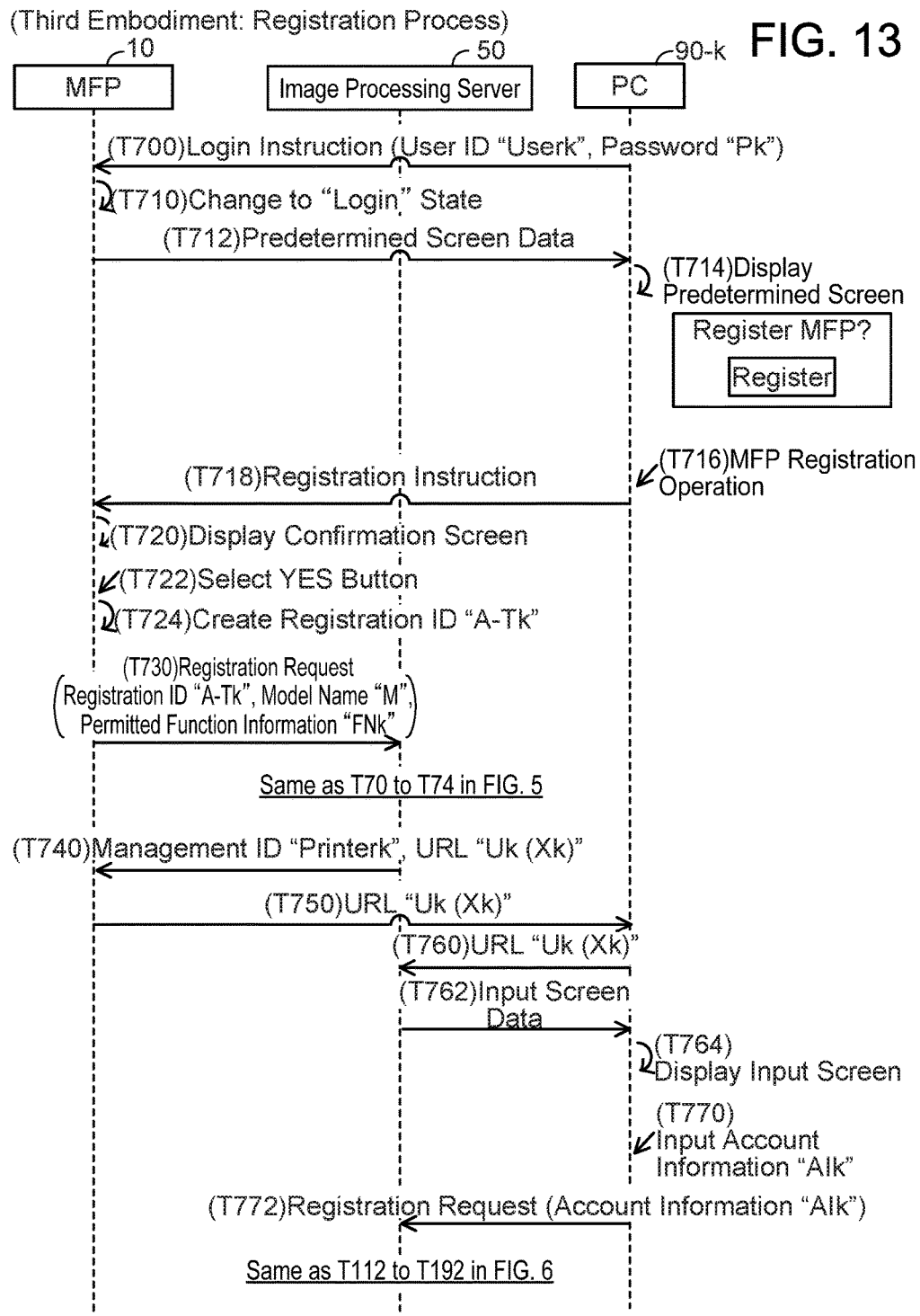
FIG. 13 shows a sequence diagram of a registration process of a third embodiment.

Third Embodiment: FIG. 13

Next, a third embodiment will be described with reference to FIG. 13. In this embodiment, the MFP 10 is provided with a so-called WEB server function, and is capable of receiving instructions to the server from an external device such as a PC. Further, a registration process of FIG. 13 is executed instead of the registration process of FIGS. 5 and 6.

In the registration process of the present embodiment, the k-th user does not log in to the server 50 (that is, T10 of FIG. 5 is not executed). In T700 of FIG. 13, the PC 90-k sends a login instruction including the user ID "Userk" and the password "Pk" to the MFP 10, in a case of receiving, from the k-th user, an instruction for accessing the WEB server of the MFP 10 to log in.

In a case of receiving the login instruction from the PC 90-k in T700, the MFP 10 changes the login state information associated with the user ID "Userk" in the table 38 from "Logout" to "Login" in T710. Then, in T712, the MFP 10 sends predetermined screen data representing a predetermined screen including a registration button to the PC 90-k.

In a case of receiving the predetermined screen data from the MFP 10 in T712, the PC 90-k displays the predetermined screen represented by the predetermined screen data in T714. Then, in a case where the registration button in the predetermined screen is selected by the k-th user in T716, the PC 90-k sends a registration instruction to the MFP 10 in T718. This registration instruction does not include the account information "AIk" of the k-th user.

T720 to T730 are the same as T50 to T60 of FIG. 5, and after T720 to T730, processes same as T70 to T74 of FIG. 5 are executed. Then, in T740, the server 50 sends the management ID "Printerk" and a URL (abbreviation of Uniform Resource Locator) "Uk" to the MFP 10. The URL "Uk" is location information indicating a location within the server 50, and includes a registration token "Xk" as a query.

In a case of receiving the management ID "Printerk" and the URL "Uk" from the server 50 in T740, the MFP 10 sends the URL "Uk" to the PC 90-k in T750.

In a case of receiving the URL "Uk" from the MFP 10 in T750, the PC 90-k sends the URL "Uk" to the server 50 and accesses the server 50 in T760.

In a case of receiving the URL "Uk" from the PC 90-k in T760, the server 50 determines whether or not the registration token "Xk" included in the URL "Uk" is identical to the registration token "Xk" included in the device information stored in T74. In the present case, since these registration tokens are identical to each other, the server 50 sends input screen data representing an input screen for inputting account information to the PC 90-k in T762.

In a case of receiving the input screen data from the server 50 in T762, the PC 90-k displays the input screen in T764. Then, in a case where the account information "AIk" is inputted to the input screen by the k-th user in T770, the PC 90-k sends a registration request including the account information "AIk" to the server 50 in T772. After this, processes same as T112 to T192 of FIG. 6 are executed. As a result, the registration of the MFP 10 in the sever 50 is completed.

According to this embodiment, the registration instruction is sent from the PC 90-k to the MFP 10 by the k-th user's selection of the registration button included in the predetermined screen displayed in the PC 90-k, in response to the k-th user's login to the MFP 10 from the PC 90-k. Due to this, the PC 90-k does not need to search for the MFP 10, and the k-th user does not need to select the device name "N" of the MFP 10 from among a plurality of device names displayed as the search result. Thus, the convenience for the user can be improved.

In the present embodiment, the "predetermined screen" displayed in T714 and the URL "U1" are an example of "predetermined screen" and "location information", respectively. The operation in T716 is an example of "predetermined operation". The processes of T712, T740, and T750 are an example of "send predetermined screen data", "receive location information", and "send the location information", respectively.

Variant of Third Embodiment

Next, a variant of the third embodiment will be described. In this variant, similarly to the second embodiment, the administrator of the MFP 10 stores the account information of the respective users in the table 38 in advance. Further, processes corresponding to T700 to T750 of FIG. 13 are performed by the administrator's operation of the MFP 10. In this case, firstly the administrator of the MFP 10 inputs administrator's own user ID and password to the PC 90-k and logs in to the MFP 10 from the PC 90-*k*. In this case, the MFP 10 receives the login instruction form the PC 90-*k* in T700, and sends a user selection list including the respective user IDs in the table 38 to the PC 90-*k*, instead of T712.

The PC 90-*k* displays the user selection list instead of T714, and receives a selection of a desired user ID among the user selection list by the administrator instead of T716. Then, in T718, the PC 90-*k* sends a registration instruction including the selected user ID to the MFP 10.

In a case of receiving the registration instruction from the PC 90-*k*, the MFP 10 executes T720 to T730. In this case, processes same as T70 to T74 of FIG. 5 are executed. Then, in a case of receiving the management ID "Printerk" and the URL "Uk" from the server 50 in T740, the MFP 10 acquires the account information "AIk", which is associated with the selected user ID included in the registration instruction received in T718, from the table 38. Here, the account information "AIk" is user's email address. Then, instead of T750, the MFP 10 sends an email including the URL "Uk" with the account information "AIk" as a destination. As a result, the email is received in the PC used by the user (for example, the PC 90-1 of the first user). When the user selects the URL "Uk" in the email, T760 to T772 are executed. Subsequent processes hereafter are same as in the third embodiment (that is, T112 to T192 of FIG. 6).

According to the present variant, primary operations for registering the MFP 10 are executed by the administrator, and thus the users can register the MFP 10 in the server 50 simply by selecting the URL "Uk" in the received email and inputting their account information "AIk" in T770. Thus, the convenience for the users can be improved.

(Variant 1) In the above embodiments, the MFP 10 receives the registration instruction by receiving the registration instruction from the PC 90-*k* (T42 of FIG. 5, T642 of FIG. 12, T718 of FIG. 13). Instead of this, the registration instruction may be received by the operation unit 12 being operated by the user.

(Variant 2) The first and second users may share the PC 90-1. In this case, the second user may operate the PC 90-1 to execute the registration process as above. That is, "second terminal device" may be same as "first terminal device".

(Variant 3) In the above embodiments, the MFP 10 sends the server 50 the registration request including the permitted function information "FNk", which is obtained from the limitation information corresponding to the k-th user (T60 in FIG. 5, T660 in FIG. 12, T730 in FIG. 13). Instead, the MFP 10 may send the server 50 a registration request including the limitation information itself corresponding to the k-th user (for example, the information indicating that the first user is permitted to use the monochrome print but is not permitted to use the color print, the color scan, and the monochrome scan). That is, in the present variant, "third process specifying information" is information identical to "first process specifying information", and "fourth process specifying information" is information identical to "second process specifying information".

(Variant 4) Following processes may be executed instead of the processes of FIG. 4. The PC 95 firstly sends the login instruction including the user ID "User1" and the password "P1" inputted by the first user to the MFP 10. In response to receiving the login instruction from the PC 95, the MFP 10 specifies the limitation information associated with the user ID "User1" and the password "P1" included in the login instruction in the table 38. Then, the MFP 10 generates the setting screen data representing the setting screen indicating only the monochrome print permitted in the specified limitation information, and sends the generated setting screen data to the PC 95. The PC 95 displays the setting screen in response to receiving the setting screen data from the MFP 10. In this case, the first user cannot select the color print in the setting screen, and can only select the monochrome print. In this variant as well, the user may be enabled to use only the image process(es) that the administrator had permitted.

(Variant 5) In the table 38, the image process limitation information may not be stored. That is, all the users may be enabled to use any of the plurality of image processes that the MFP 10 is capable of executing. In this case, permitted function information indicating both the color print and the monochrome print that the MFP 10 is capable of executing is sent to the server 50 in T60 of FIG. 5, and device information including this permitted function information is registered in the server 50. In the present variant, "cause the image process executing unit to execute a target image process" may be omitted.

(Variant 6) In the above embodiments, the server 50 executes intermediation of printing between the MFP 10 and the PCs 90 and the like, however, it may execute intermediation of scanning instead. In this case, in T60 of FIG. 5, the MFP 10 sends the server 50 the permitted function information "FNk" indicating a scan process of which use is permitted to the k-th user. Due to this, in T250 of FIG. 7 or T450 of FIG. 8, a setting screen in which the scan process specified by the permitted function information "FNk" can be selected is displayed. In response to receiving a scan setting from the PC 90-1 used by the first user, the server 50 sends a scan instruction including the scan setting to the MFP 10 instead of T270 to T310 of FIG. 7. As a result, the MFP 10 executes the scan process according to the scan setting included in the scan instruction, and sends its scan data to the server 50. In this case, the server 50 sends this scan data to the PC 90-1. Similarly, in response to receiving a scan setting from the PC 90-2 used by the second user, the server 50 sends a scan instruction including this scan setting to the MFP 10 instead of T470 to T510 of FIG. 8. As a result, the MFP 10 executes a scan process according to the scan setting included in the scan instruction, and sends its scan data to the server 50. In this case, the server 50 sends this scan data to the PC 90-2. In this variant, the color scan and the monochrome scan are examples of "plurality of image processes", and the scan data for the first user and the scan data for the second user are an example of "first target data" and "second target data", respectively.

(Variant 7) The server 50 may use the registration ID "A-T1" received in T60 as the management ID, instead of creating the management ID "Printerk" in T72. That is, the "management identification information" may be identical to the "device identification information", and thus "receive management identification information" may be omitted.

(Variant 8) The process of S105 of FIG. 10 may be omitted. In this case, in the case of determining YES in S100, the MFP 10 sends a print job request to the server 50 in S110. That is, in "execute a communication with the server", a communication of the first (or second) target data may be executed with the server regardless whether the state of the communication device is in the login state using the first (or second) user information or not.

(Variant 9) The process of T33 of FIG. 5 may be omitted. In this case, in the case of receiving the search signal from the PC 90-*k*, the MFP 10 sends the device name "N" to the PC 90-*k* in T34, regardless whether the registration state information is "Registered" or "Unregistered". In this variant, "determine whether completion information is stored in association with the target user information in the memory" may be omitted.

(Variant 10) "Communication device" is not limited to the MFP 10, and may be a printer capable of executing only print process, a scanner capable of executing only scan process, or a device capable of executing a process different from the print process and the scan process (such as a PC, a server, etc.).

(Variant 11) In the above embodiments, the processes of FIGS. 4 to 10, FIG. 12, and FIG. 13 are implemented by software (i.e., the program 36), however, at least one of these processes may be implemented by hardware such as a logic circuit.

What is claimed is:

1. A communication device comprising:
  a memory; and
  a processor configured to:
    receive an input of a registration instruction for registering information related to the communication device in a server;
    send a registration request including device identification information of the communication device to the server, in a case where the input of the registration instruction is received,
  wherein in the server, in a case where the device identification information included in the registration request received from the communication device is not registered in the server, the device identification information, account information, and communication authentication information are registered in association with each other,
    the account information is used for a login operation to the server by a user of the communication device, and
    the communication authentication information is to be used by the communication device for a communication with the server,
    receive the communication authentication information associated with the device identification information from the server;
    store the communication authentication information received from the server in the memory; and
    execute a communication with the server by using the communication authentication information stored in the memory,
  wherein in a case where an input of a first registration instruction is received:
    a first registration request including first device identification information is sent to the server,
      wherein in the server, the first device identification information, first account information used by a first user of the communication device for a login operation to the server, and first communication authentication information are registered in association with each other;
    the first communication authentication information is received from the server; and
    the first communication authentication information is stored in the memory,
  wherein in a case where an input of a second registration instruction is received:
    a second registration request including second device identification information is sent to the server, the second device identification information being different from the first device identification information,
      wherein in the server, the second device identification information, second account information used by a second user of the communication device for a login operation to the server, and second communication authentication information are registered in association with each other, the second user being different from the first user, the second account information being different from the first account information, the second communication authentication information being different from the first communication authentication information;
    the second communication authentication information is received from the server; and
    the second communication authentication information is stored in the memory,
  wherein in a state where the first communication authentication information and the second communication authentication information are stored in the memory, the communication device is configured to execute a communication with the server for the first user by using the first communication authentication information and execute a communication with the server for the second user by using the second communication authentication information, and
  wherein in a case where the login operation to the server by using the first account information is executed by the first user in a first terminal device and the first terminal device sends a first communication instruction to the server, the communication device is configured to execute a communication of first target data with the server, and
  in a case where the login operation to the server by using the second account information is executed by the second user in a second terminal device and the second terminal device sends a second communication instruction to the server, the communication device is configured to execute a communication of second target data with the server.

2. The communication device as in claim 1, wherein in a case where the input of the first registration instruction is received:
  the first device identification information is created by using first current time; and
  the first registration request including the created first device identification information is sent to the server,
in a case where the input of the second registration instruction is received:
  the second device identification information is created by using second current time being different from the first current time; and
  the second registration request including the created second device identification information is sent to the server.

3. The communication device as in claim 1, wherein in a case where a first execution instruction for instructing the communication device that the communication of the first target data is to be executed is received from the server, after the login operation to the server by the first user using the first account information has been executed in the first terminal device and the first terminal device has sent the first communication instruction to the server, the communication of the first target data with the server is executed, and
in a case where a second execution instruction for instructing the communication device that the communication of the second target data is to be executed is received from the server, after the login operation to the server by the second user using the second account information has been executed in the second terminal device and the second terminal device has sent the second communication instruction to the server, the communication of the second target data with the server is executed.

4. The communication device as in claim 3, wherein the processor is further configured to:

receive management identification information being different from the device identification information from the server after the registration request has been sent to the server, wherein in a case where the first communication authentication information and first management identification information are received from the server, the first communication authentication information and the first management identification information are stored in association with each other in the memory, in a case where the second communication authentication information and second management identification information being different from the first management identification information are received from the server, the second communication authentication information and the second management identification information are stored in association with each other in the memory, in a case where the first execution instruction including the first management identification information is received from the server, the communication of the first target data with the server is executed by using the first communication authentication information associated with the first management identification information in the memory, and in a case where the second execution instruction including the second management identification information is received from the server, the communication of the second target data with the server is executed by using the second communication authentication information associated with the second management identification information in the memory.

5. The communication device as in claim 4, wherein in the case where the first communication authentication information and the first management identification information are received from the server, the first communication authentication information, the first management identification information, and first user information for identifying the first user are stored in association with each other in the memory, in the case where the second communication authentication information and the second management identification information are received from the server, the second communication authentication information, the second management identification information, and second user information for identifying the second user are stored in association with each other in the memory, the second user information being different from the first user information, and the processor is further configured to:
determine whether a state of the communication device is a login state using the first user information associated with the first management identification information in the memory, in the case where the first execution instruction including the first management identification information is received from the server, wherein in a case where it is determined that the state of the communication device is the login state using the first user information, the communication of the first target data with the server is executed by using the first communication authentication information, and in a case where it is determined that the state of the communication device is not the login state using the first user information, the communication of the first target data with the server is not executed; and determine whether the state of the communication device is a login state using the second user information associated with the second management identification information in the memory, in the case where the second execution instruction including the second management identification information is received from the server, wherein in a case where it is determined that the state of the communication device is the login state using the second user information, the communication of the second target data with the server is executed by using the second communication authentication information, and in a case where it is determined that the state of the communication device is not the login state using the second user information, the communication of the second target data with the server is not executed.

6. The communication device as in claim 1, wherein the input of the registration instruction is received by receiving the registration instruction from a terminal device, in a case where a predetermined operation is executed in a predetermined screen represented by predetermined screen data which is sent to the terminal device from the server in response to the login operation to the server by the user using the account information being executed in the terminal device, the registration request is sent to the server in a state where the server is logged in by using the account information, and the processor is further configured to:
receive registration authentication information from the server after the registration request has been sent to the server, and send the registration authentication information to the terminal device, in a case where the registration authentication information is received from the server, wherein in the server, in a case where the registration request is received from the communication device, and the account information by which the server is logged in and the registration authentication information are received from the terminal device, the device identification information, the account information, and the communication authentication information are registered in association with each other.

7. The communication device as in claim 1, wherein the memory is capable of storing, for each of one or more users, user information for identifying the user and account information used for a login operation to the server by the user in association with each other, the registration instruction includes logged-in account information by which the server is currently logged in, the processor is further configured to:
receive an input of user information; and
in a case where an input of target user information is received and the input of the registration instruction including the logged-in account information is received, determine whether target account information associated with the target user information in the memory is identical to the logged-in account information included in the registration instruction, wherein in a case where it is determined that the target account information is identical to the logged-in account information, the registration request is sent to the server, and in a case where it is determined that the target account information is not identical to the logged-in account information, the registration request is not sent to the server.

8. The communication device as in claim 1, wherein
the memory is capable of storing, for each of one or more users, user information for identifying the user,
the processor is further configured to:
    receive an input of user information;
    receive a search signal for searching the communication device from a terminal device;
    in a case where an input of target user information is received and the search signal is received from the terminal device, determine whether completion information is stored in association with the target user information in the memory, the completion information indicating that a registration of the communication device to the server has been completed; and
    send a device name of the communication device to the terminal device, in a case where it is determined that the completion information is not stored in association with the target user information in the memory,
    wherein the device name is not sent to the terminal device, in a case where it is determined that the completion information is stored in association with the target user information in the memory,
wherein the input of the registration instruction is received by receiving the registration instruction from the terminal device, in a case where the device name is selected in the terminal device after the device name has been sent to the terminal device.

9. The communication device as in claim 1, wherein
the memory is capable of storing, for each of one or more users, account information used for a login operation to the server by the user,
the registration instruction includes logged-in account information by which the server is currently logged in,
the processor is further configured to:
    determine whether the logged-in account information included in the registration instruction is stored in the memory,
    wherein in a case where it is determined that the logged-in account information is stored in the memory, the registration request is sent to the server, and
    in a case where it is determined that the logged-in account information is not stored in the memory, the registration request is not sent to the server.

10. The communication device as in claim 9, wherein
the processor is further configured to:
in the case where it is determined that the logged-in account information is stored in the memory, determine whether completion information is stored in association with the logged-in account information in the memory, the completion information indicating that a registration of the communication device to the server has been completed,
    wherein in a case where it is determined that the logged-in account information is stored in the memory and the completion information is not stored in association with the logged-in account information in the memory, the registration request is sent to the server, and
    in a case where it is determined that the logged-in account information is stored in the memory and the completion information is stored in association with the logged-in account information in the memory, the registration request is not sent to the server.

11. The communication device as in claim 1, wherein
the processor is further configured to:
    send predetermined screen data to a terminal device,
    wherein in a case where a predetermined operation is executed in a predetermined screen represented by the predetermined screen data after the predetermined screen data has been sent to the terminal device, the input of the registration instruction is received by receiving the registration instruction from the terminal device,
the processor is further configured to:
    receive, from the server, location information indicating a location in the server after the registration request has been sent to the server, the location information including registration authentication information; and
    send the location information to the terminal device, in a case where the location information is received from the server,
    wherein in the terminal device, in a case where the location information is received from the communication device, input screen data indicated by the location information is received from the server in response to the location information including the registration authentication information being sent to the server,
    in the server, in a case where the registration request is received from the communication device and the account information inputted in an input screen represented by the input screen data is received from the terminal device, the device identification information, the account information, and the communication authentication information are registered in association with each other.

12. The communication device as in claim 1, wherein
the memory is capable of storing, for each of one or more users, user information for identifying the user and account information used for a login operation to the server by the user in association with each other,
the processor is further configured to:
    receive an input of user information;
    receive, from the server, logged-in account information by which the server is currently logged in, after the registration request has been sent to the server, and
    in a case where an input of target user information is received and the logged-in account information is received, determine whether target account information associated with the target user information in the memory is identical to the logged-in account information,
    wherein in a case where it is determined that the target account information is identical to the logged-in account information, a sending request for requesting that the communication authentication information is sent to the server, and the communication authentication information is received from the server, and in a case where it is determined that the target account information is not identical to the logged-in account information, the sending request is not sent to the server.

13. The communication device as in claim 1, wherein the memory is capable of storing, for each of plurality of users, user information for identifying the user and process specifying information corresponding to the user in association with each other, the process specifying information is information for specifying one or more image processes permitted to be used by a user corresponding to the process specifying information among a plurality of image processes which are executable by the communication device, the communication device further comprises an image process executing unit configured to execute the plurality of image processes, the processor is further configured to:

cause the image process executing unit to execute a target image process, in a case where an execution of the target image process permitted to be used by a target user among the plurality of image processes is instructed from the target user not via the server, wherein the target image process is specified based on target process specifying information corresponding to the target user in the memory;

receive an input of user information;

acquire first process specifying information associated with first user information in the memory, in a case where an input of the first user information for identifying the first user is received and the input of the first registration instruction is received; and acquire second process specifying information associated with second user information in the memory, in a case where an input of the second user information for identifying the second user is received and the input of the second registration instruction is received, wherein the first registration request including the first device identification information and third process specifying information obtained by using the acquired first process specifying information is sent to the server, the third process specifying information being information for specifying one or more image processes permitted to be used by the first user among the plurality of image processes, wherein in the server, in a case where the first registration request is received from the communication device, the first device identification information, the first account information, the first communication authentication information, and the third process specifying information are registered in association with each other, the second registration request including the second device identification information and fourth process specifying information obtained by using the acquired second process specifying information is sent to the server, the fourth process specifying information being information for specifying one or more image processes permitted to be used by the second user among the plurality of image processes, wherein in the server, in a case where the second registration request is received from the communication device, the second device identification information, the second account information, the second communication authentication information, and the fourth process specifying information are registered in association with each other, the first communication instruction includes first setting information indicating a first image process which is selected by the first user from the one or more image processes specified by the third process specifying information registered in association with the first account information in the server, the second communication instruction includes second setting information indicating a second image process which is selected by the second user from the one or more image processes specified by the fourth process specifying information registered in association with the second account information in the server, the processor is further configured to:

cause the image process executing unit to execute the first image process indicated by the first setting information, in a case where the first setting information is received from the server after the first communication instruction has been given to the server, and cause the image process executing unit to execute the second image process indicated by the second setting information, in a case where the second setting information is received from the server after the second communication instruction has been given to the server, wherein the first target data corresponds to the first image process, and the second target data corresponds to the second image process.

14. The communication device as in claim 1, wherein the memory is capable of storing, for each of plurality of users, account information used for a login operation to the server by the user and process specifying information corresponding to the user in association with each other, the process specifying information is information for specifying one or more image processes permitted to be used by a user corresponding to the process specifying information among a plurality of image processes executable by the communication device, the communication device further comprising an image process executing unit configured to execute the plurality of image processes, the processor is further configured to:

cause the image process executing unit to execute a target image process, in a case where an execution of the target image process permitted to be used by a target user among the plurality of image processes is instructed from the target user not via the server, wherein the target image process is specified to be permitted based on target process specifying information corresponding to the target user in the memory; and acquire first process specifying information associated with the first account information in the memory, in a case where the input of the first registration instruction including the first account information is received; and acquire second process specifying information associated with the second account information in the memory, in a case where the input of the second registration instruction including the second account information is received, wherein the first registration request including the first device identification information and third process specifying information obtained by using the acquired first process specifying information is sent to the server, the third process specifying information being information for specifying one or more image processes permitted to be used by the first user among the plurality of image processes,
  wherein in the server, in a case where the first registration request is received from the communication device, the first device identification information, the first account information, the first communication authentication information, and the third process specifying information are registered in association with each other,
the second registration request including the second device identification information and fourth process specifying information obtained by using the acquired second process specifying information is sent to the server, the fourth process specifying information being information for specifying one or more image processes permitted to be used by the second user among the plurality of image processes,
  wherein in the server, in a case where the second registration request is received from the communication device, the second device identification information, the second account information, the second communication authentication information, and the fourth process specifying information are registered in association with each other,
the first communication instruction includes first setting information indicating a first image process which is selected by the first user from the one or more image processes specified by the third process specifying information registered in association with the first account information in the server,
the second communication instruction includes second setting information indicating a second image process which is selected by the second user from the one or more image processes specified by the fourth process specifying information registered in association with the second account information in the server,
the processor is further configured to:
  cause the image process executing unit to execute the first image process indicated by the first setting information, in a case where the first setting information is received from the server after the first communication instruction has been given to the server, and
  cause the image process executing unit to execute the second image process indicated by the second setting information, in a case where the second setting information is received from the server after the second communication instruction has been given to the server,
wherein the first target data corresponds to the first image process, and
the second target data corresponds to the second image process.

15. A non-transitory computer-readable recording medium storing computer-readable instructions for a communication device,
  wherein the computer-readable instructions, when executed by a processor of the communication device, cause the communication device to:
receive an input of a registration instruction for registering information related to the communication device in a server;
send a registration request including device identification information of the communication device to the server, in a case where the input of the registration instruction is received,
  wherein in the server, in a case where the device identification information included in the registration request received from the communication device is not registered in the server, the device identification information, account information, and communication authentication information are registered in association with each other,
  the account information is used for a login operation to the server by a user of the communication device, and
  the communication authentication information is to be used by the communication device for a communication with the server;
receive the communication authentication information associated with the device identification information from the server;
store the communication authentication information received from the server in a memory of the communication device; and
execute a communication with the server by using the communication authentication information stored in the memory,
wherein in a case where an input of a first registration instruction is received:
  a first registration request including first device identification information is sent to the server,
    wherein in the server, the first device identification information, first account information used by a first user of the communication device for a login operation to the server, and first communication authentication information are registered in association with each other;
  the first communication authentication information is received from the server; and
  the first communication authentication information is stored in the memory,
wherein in a case where an input of a second registration instruction is received:
  a second registration request including second device identification information is sent to the server, the second device identification information being different from the first device identification information;
    wherein in the server, the second device identification information, second account information used by a second user of the communication device for a login operation to the server, and second communication authentication information are registered in association with each other, the second user being different from the first user, the second account information being different from the first account information, the second communication authentication information being different from the first communication authentication information;
  the second communication authentication information is received from the server, and
  the second communication authentication information is stored in the memory,
wherein in a state where the first communication authentication information and the second communication authentication information are stored in the memory, the communication device is configured to execute a communication with the server for the first user by using the first communication authentication information and execute a communication with the server for the second user by using the second communication authentication information, and wherein in a case where the login operation to the server by using the first account information is executed by the first user in a first terminal device and the first terminal device sends a first communication instruction to the server, the communication device is configured to execute a communication of first target data with the server, and in a case where the login operation to the server by using the second account information is executed by the second user in a second terminal device and the second terminal device sends a second communication instruction to the server, the communication device is configured to execute a communication of second target data with the server.

16. A method comprising;

receiving an input of a registration instruction for registering information related to a communication device in a server, sending a registration request including device identification information of the communication device to the server, in a case where the input of the registration instruction is received, wherein in the server, in a case where the device identification information included in the registration request received from the communication device is not registered in the server, the device identification information, account information, and communication authentication information are registered in association with each other, the account information is used for a login operation to the server by a user of the communication device, and the communication authentication information is to be used by the communication device for a communication with the server;

receiving the communication authentication information associated with the device identification information from the server, storing the communication authentication information received from the server in a memory of the communication device; and executing a communication with the server by using the communication authentication information stored in the memory, wherein in a case where an input of a first registration instruction is received:

a first registration request including first device identification information is sent to the server;

wherein in the server, the first device identification information, first account information used by a first user of the communication device for a login operation to the server, and first communication authentication information are registered in association with each other, the first communication authentication information is received from the server; and the first communication authentication information is stored in the memory, wherein in a case where an input of a second registration instruction is received:

a second registration request including second device identification information is sent to the server, the second device identification information being different from the first device identification information;

wherein in the server, the second device identification information, second account information used by a second user of the communication device for a login operation to the server, and second communication authentication information are registered in association with each other, the second user being different from the first user, the second account information being different from the first account information, the second communication authentication information being different from the first communication authentication information;

the second communication authentication information is received from the server, and the second communication authentication information is stored in the memory, wherein in a state where the first communication authentication information and the second communication authentication information are stored in the memory, the communication device is configured to execute a communication with the server for the first user by using the first communication authentication information and execute a communication with the server for the second user by using the second communication authentication information, and wherein in a case where the login operation to the server by using the first account information is executed by the first user in a first terminal device and the first terminal device sends a first communication instruction to the server, the communication device is configured to execute a communication of first target data with the server, and in a case where the login operation to the server by using the second account information is executed by the second user in a second terminal device and the second terminal device sends a second communication instruction to the server, the communication device is configured to execute a communication of second target data with the server.

* * * * *